United States Patent [19]
Shimizu

[11] Patent Number: 6,052,202
[45] Date of Patent: Apr. 18, 2000

[54] OUTPUT DEVICE, INFORMATION PROCESSING APPARATUS MEMORY CONTROL METHOD AND MEMORY MEDIUM

[75] Inventor: Haruo Shimizu, Kawasaki, Japan

[73] Assignee: Canon Kabushiki Kaisha, Tokyo, Japan

[21] Appl. No.: 09/130,371

[22] Filed: Aug. 7, 1998

Related U.S. Application Data

[62] Division of application No. 08/670,589, Jun. 26, 1996.

[30] Foreign Application Priority Data

Jun. 28, 1995 [JP] Japan .................................. 7-162152
Jun. 28, 1995 [JP] Japan .................................. 7-162190
Jul. 14, 1995 [JP] Japan .................................. 7-178709

[51] Int. Cl.[7] .................................................. G06K 15/00
[52] U.S. Cl. ........................................ 358/1.16; 358/1.2
[58] Field of Search .................................. 395/112, 113, 395/115, 102, 116, 117, 828, 822, 829, 830, 833, 834, 872, 876, 877, 894; 358/404, 444, 296, 298

[56] References Cited

U.S. PATENT DOCUMENTS 4,860,119  8/1989  Maniwa et al. ........................ 358/296
5,108,207  4/1992  Isobe et al. ............................ 395/115
5,488,708  1/1996  Hayashi ................................. 395/115

*Primary Examiner*—Arthur G. Evans
*Attorney, Agent, or Firm*—Fitzpatrick, Cella, Harper & Scinto

[57] ABSTRACT

An information processing apparatus has a derivation unit which derives a usable memory size, and a controller which determines a default value of the memory to be used, according to the derived size.

30 Claims, 25 Drawing Sheets

FIG. 4

| PRINT ASSURANCE SIZE | REQUIRED MEM SIZE |
|---|---|
| UNASSURED | 2.6M |
| A4 | 5.2M |
| B4 | 7.4M |
| A3 | 9.6M |
| B4*2 | 14.0M |
| A3*2 | 18.0M |
| B4*3 | 20.6M |
| A3*3 | 26.6M |

FIG. 5

| RAM SIZE | AVAILABLE SIZE |
|---|---|
| 4MB (STANDARD) | AUTO, UNASSURED (*) |
| 8MB (+4MB) | AUTO, UNASSURED, A4 (*) |
| 12MB (+8MB) | AUTO, UNASSURED, A4, B4, A3 (*) |
| 16MB (+12MB) | AUTO, UNASSURED, A4, B4, A3, B4×2 (*) |
| 20MB (+16MB) | AUTO, UNASSURED, A4, B4, A3, B4×2, A3×2 (*) |
| 24MB (+20MB) | AUTO, UNASSURED, A4, B4, A3, B4×2, A3×2, B4×3 (*) |
| 28MB (+24MB) | AUTO, UNASSURED, A4, B4, A3, B4×2, A3×2, B4×3 (*) |
| 36MB (+32MB) | AUTO, UNASSURED, A4, B4, A3, B4×2, A3×2, B4×3, A3×3 (*) |

FIG. 6

| RAM SIZE | AVAILABLE SIZE |
|---|---|
| 4MB (STANDARD) | AUTO, 200K*, 400K, 600K |
| 8MB (+4MB) | AUTO, 200K, 400K*, 600K, 1000K |
| 12MB (+8MB) | AUTO, 200K, 400K, 600K*, 1000K |
| 16MB (+12MB) | AUTO, 200K, 400K, 600K*, 1000K |
| 20MB (+16MB) | AUTO, 200K, 400K, 600K*, 1000K |
| 24MB (+20MB) | AUTO, 200K, 400K, 600K*, 1000K |
| 28MB (+24MB) | AUTO, 200K, 400K, 600K, 1000K* |
| 36MB (+32MB) | AUTO, 200K, 400K, 600K, 1000K* |

FIG. 22

```
{ESC} JOB START
SET SYSTEM_WORK_SIZE=200K/*SYSTEM WORK MEM SIZE*/
SET_RASTER_MEMORY_SIZE=A4/*PRINT ASSURANCE MEM SIZE*/
{ESC} PDL START
...
PDL DATA
...
{ESC} PDL END
{ESC} JOB END
```

FIG. 25

```
{ESC} JOB START  ─────────┐
SET INPUT_BUFFER_SIZE=100K │
SET_RASTER_MEMORY_SIZE=1024K│
SET CLIP_SIZE=50K          │
  {ESC} PDL START ───┐     │
  ...                │     │
  PDL DATA           │ PDL │ JL
  ...                │     │
  {ESC} PDL END  ────┘     │
{ESC} JOB END  ───────────┘
```

OUTPUT DEVICE, INFORMATION PROCESSING APPARATUS MEMORY CONTROL METHOD AND MEMORY MEDIUM

This application is a division of application Ser. No. 08/670,589, filed Jun. 26, 1996.

BACKGROUND OF THE INVENTION

1. Field of the Invention

The present invention relates to an information processing apparatus such as a printer capable of designating the capacity of the memory to be used, a memory control method and a memory medium therefor.

The present invention also relates to an output device such as a printer, for generating output data and outputting such data based on input data entered from an external equipment such as a host computer, a memory control method and a memory medium therefor.

2. Related Background Art

The memory size to be used in an information processing apparatus such as a printer has been designated by a command from a host computer or from a panel of the information processing apparatus.

In the conventional information processing apparatus, however, in a case where the available memory capacity is increased by the connection of an extended memory (for example RAM), the user has been unable to easily control the memory resource according to the desired application.

The printer is usually provided with a PDL (Page Description Language) analyzing program (emulation program) for generating output data by analyzing printer languages of plural different command systems.

The PDL analyzing programs can be classified into those characterized in the advanced graphics function as represented by PostScript (trade name) and those characterized by their high-speed processing function, as represented by LIPS (trade name) or PCL (trade name).

In general, the user determines the PDL of the printer according to the purpose of his application, the host computer used and the environment of the network.

In such a situation, it has become desirable to utilize plural page description languages in a single printer, instead of utilizing such plural languages in plural printers, and such requirement has been met by a technology called multi PDL emulation.

Such technology is generally realized by taking a certain page description language as the base and emulating other languages on such base technology.

In such multi-PDL emulation, as the hardware for a certain page description language is used for emulating other languages, it is difficult to regulate, among plural page description languages, the allocation of various resources, particularly that of the band raster memory.

More specifically, in a case where a system optimized for a page description language "A" is used for another page description language "B", the allocation of the resource (band raster memory) in such language "B" is not necessarily optimum in comparison with that in the language "A".

Also, the allocation of the optimum raster memory for banding varies, in the case of an extension of the memory capacity, according to the presence of two-side printing control, the internal raster resolution for the printing process, and the nature of the data (principally image or characters) within the page description language.

In a common memory configuration (wherein a full-memory area can be selected in the raster memory and the object memory (intermediate buffer)), the magnitude of the required or optimum raster memory generally satisfies the following relations:

extension memory added>standard memory two-side printing control present
>two-side printing control absent low printing resolution>high printing resolution data principally composed of characters
>data principally composed of image Also, the page description language is not necessarily independent of the resolution but may have a resolution optimum for the rendering process (drawing process for generating output data from the intermediate data).

For such varied requirements, it has conventionally been not possible to flexibly secure the band raster memory and the object memory for each job, and initialization of the printer has therefore been necessary.

Also, in such multi PDL emulation mentioned above, since the configuration for a given PDL is used for other languages, the allocation of resources such as memory is not adequately adjusted among the plural page description languages.

More specifically, in a case where a system optimized for a page description language "A" is used for another page description language "B", the resource allocation in such language "B" is not necessary optimum in comparison with that in the language "A".

Also, even in data processing in the PDL "A", the optimum memory allocation varies between a job "C" for principally processing images and a job "D" for principally processing line images, but the memory allocation in the current technology is already encoded in the page description language and cannot be dynamically changed.

SUMMARY OF THE INVENTION

In consideration of the foregoing, an object of the present invention is to provide an information processing apparatus and a memory control method therefor, capable of deriving the available memory capacity and determining the default value of the memory to be used, according to thus derived available memory capacity.

The above-mentioned object can be attained, according to the present invention, by an information processing apparatus comprising derivation means for deriving the available memory capacity and control means for determining the default value of the memory to be used according to the capacity deviced by the derivation means.

The above-mentioned object can also be attained, according to the present invention, by a memory control method comprising the steps of deriving the available memory capacity and determining the default value of the memory to be used according to thus derived capacity.

Thus, the present invention has, as one feature, deriving the available memory capacity and determining the default value of the memory to be used according to the thus derived memory capacity.

Another object of the present invention is to provide an output device and a memory control method, capable of varying the raster memory capacity for each job to be performed, according to a memory set value entered from an external equipment or an operation unit of the output device.

Still another object of the present invention is to provide an output device and a memory control method, capable of varying the object memory capacity for each job to be performed, according to a memory set value entered from an external equipment or an operation unit of the output device.

The above-mentioned objects can be attained, according to the present invention, by an output device for generating output data and outputting such data based on input data entered from an external equipment, comprising generation means for generating intermediate data based on the input data entered from the external equipment, a raster memory for generating and storing output data based on the intermediate data generated by the generation means, and control means for varying the capacity of the raster memory for each job to be processed, based on a memory set value entered from the external equipment or from an operation unit of the output device.

The above-mentioned objects can be attained, according to the present invention, by an output device for generating output data and outputting such data based on input data entered from an external equipment, comprising generation means for generating intermediate data based on the input data entered from the external equipment, an object memory for storing the intermediate data generated by the generation means, and control means for varying the capacity of the object memory for each job to be processed, based on a memory set value entered from the external equipment or from an operation unit of the output device.

Also the above-mentioned objects can be attained, according to the present, by a memory control method for use in an output device for generating output data and outputting such data based on input data entered from an external equipment, comprising a generation step for generating intermediate data based on the input data entered from the external equipment, and a control step for varying the capacity of a raster memory for generating and storing output data based on the intermediate data generated in the generation step, for each job to be executed, based on a memory set value entered from the external equipment or an operation unit of the output device.

Also the above-mentioned objects can be attained, according to the present invention, by a memory control method for use in an output device for generating output data and outputting such data based on input data entered from an external equipment, comprising a generation for generating intermediate data based on the input data entered from the external equipment, and a control step for varying the capacity of an object memory for storing the intermediate data generated in the generation step, for each job to be executed, based on a memory set value entered from the external equipment or an operation unit of the output device.

Still another object of the present invention is to provide an output device and a memory control method for varying the total capacity of predetermined memories to be used in the output device to a designated set value, for each job to be executed, based on memory control information entered from an external equipment or from an operation unit of the output device.

The above-mentioned object can be attained, according to the present invention, by an output device for generating output data and outputting such data based on the intermediate data, comprising discrimination means for discriminating a set value based on memory control information entered from the external equipment or an operation unit of the output device, and control means for varying the total capacity of the predetermined memories to be used in the output device to a set value, for each job to be executed, based on the result of discrimination by the discrimination means.

The above-mentioned object can also be attained, according to the present invention, by a memory control method for use in an output device for generating output data and outputting such data based on the intermediate data, comprising a discrimination step for discriminating a set value based on memory control information entered from the external equipment or an operation unit of the output device, and a control step for varying the total capacity of the predetermined memories to be used in the output device to a set value, for each job to be executed, based on the result of discrimination by the discrimination step.

BRIEF DESCRIPTION OF THE DRAWINGS

FIG. 4 is a table showing the relationship between print assurance size and required memory size in the above-mentioned embodiment;

FIG. 5 is a table showing the relationship between memory size, available print assurance memory size and default value;

FIG. 6 is a table showing the relationship between memory size, available system work memory size and default value;

FIG. 22 is a view showing an example of job control language in the above-mentioned embodiment;

FIG. 25 is a view showing example of a job control language in the another embodiment;

DESCRIPTION OF THE PREFERRED EMBODIMENTS

Now the present invention will be clarified in detail by description of the preferred embodiments, shown in the attached drawings.

Figure 1:
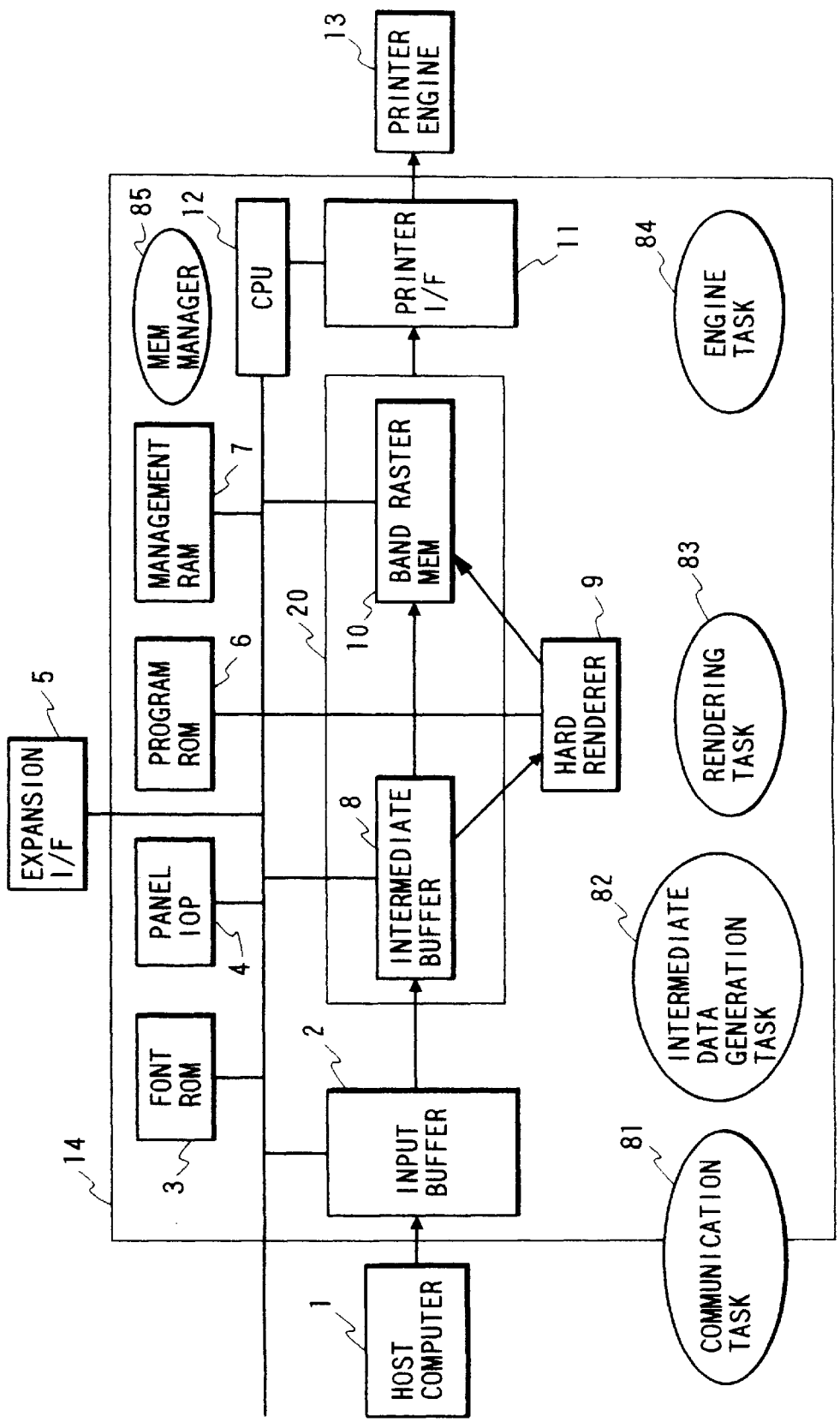
FIG. 1 is a block diagram showing the basic configuration of a data print/recording device embodying the present invention.

FIG. 1 is a block diagram showing the basic configuration of a printing device embodying the present invention, and the process flow will be outlined with reference to this drawing.

ENTIRE CONFIGURATION

A work station (host computer) 1 prepares various print information (for example characters, image, vector graphics, etc.) as an application, and sends the obtained data to a controller 14 of the recording device after conversion into the format of a page description language (PDL).

The flow of the PDL data between the computer and the controller 14 may be conducted in any communication form such as by serial communication, network connection or bus connection, but a high-speed communication path is preferably employed in consideration of the performance.

The transmitted PDL data are stored in an input buffer 2 by a communication task 81 (a communication program executed by a CPU 12), and the input data are scanned by an intermediate data generation task 82 (a PDL command analyzing program executed by the CPU 12).

A font ROM 3, storing character glyph information such as bit patterns or output line font of the characters, and also character baselines and character metric information, is used for character printing.

A panel IOP 4, consisting of an I/O processor and a firmware for controlling the detection of switch inputs and LCD display on an operation panel provided on the printing device, is composed of a low-priced CPU.

An expansion I/F 5 constitutes an interface with printer expansion modules (font ROM, program ROM, RAM and hard disk).

A ROM 6 stores control programs of a communication task 81, an intermediate data generation task 82, a rendering task 83, an engine task 84 and a memory manager 85 to be executed by the CPU 12, and control programs corresponding to flow charts in FIGS. 3, 8, 14, 23, 24 and 26.

A memory management RAM area 7 is used for storing information acquired in each job according to the present invention (cf. FIG. 2) and tables used for acquiring such information (cf. FIGS. 4 to 6).

An intermediate buffer (RAM) 8 is used for storing intermediate data (object data), obtained by analyzing the input data (PDL data) through the execution of the intermediate data generation task 82, and is managed by the memory manager 85.

These memory management RAM 7, intermediate buffer 8 and band raster memory 10 to be explained in the following, explained independently, in fact constitute the principal feature of the present invention and are controlled by the memory manager 85. In addresses, they may occupy a continuous address space or separate address spaces.

A hard renderer 9 executes a rendering process (generation of output data from intermediate data) by an ASIC hardware, on real-time basis in synchronization with the video signal transfer to a printer engine 13 (LBP) and stores the generated data in a band raster memory 10, thereby realizing a banding process with a limited memory capacity.

A complex PDL command not executable with the hardware is executed by an interruption process by the hard renderer 9 in the CPU 12 and by a soft rendering process therein according to the rendering task 83.

A band raster memory 10 is used for storing the output data (band image) developed by the PDL (page description language), and has a size of at least two bands for the above-mentioned banding process (a memory size of a width of the full page times 256 or 512 lines in case of processing intermediate data of A3 size with 600 dpi in a printer of a total memory size of 4M, but this memory size increasing proportionally with the connection of an external memory), or a full bit-map memory size (memory size for controlling a full paint control) in a device in which the image data have to be transferred in synchronization with the engine instead of the banding process, such as an LBP.

The banding control can provide the performance of the highest speed and enables the output of the printer engine at the highest speed, (depending on the intermediate data). However, as the rasterizing (rendering) is executed in synchronization with the output of the printer engine, it is essential that the intermediate data of a page can be buffered and that the rasterizing can be completed within the sheet transporting time of the printer engine.

The full paint control may be inferior in the performance to the banding process, but enables output from the printer engine at the highest speed, depending on the intermediate data. Also it can ensure the output for any intermediate data, since the sheet transportation in the printer engine is started after the rasterization of a page. It is however essential to store the output data (bit-map data) of a page.

However, in case of a printing device in which the head movement can be controlled by the controller, such as a thermal ink jet printer, it is only required to secure at least the band memory mentioned above.

A printer interface 11 transfers the content of the band raster memory 10 to a printer engine 13 such as an LBP, as video information synchronized with the horizontal and vertical synchronization signals of the printer engine.

Otherwise it effects head control in a thermal ink jet printer and transfer of the video information matching the head size of plural lines. This interface may be composed of an exclusive CPU or hardware or may utilize a part of the CPU, but the former is preferred in consideration of the performance.

This interface also effects transmission of commands to the printer engine 13 and reception of status signals therefrom. These functions are processed by the engine task 84, but do not require a high process speed as in the video information transfer explained above.

A CPU 12 controls the processes in the printer controller 14, and is preferably composed of a high-speed device such as a RISK CPU, for improving the performance.

A printer engine 13, for printing the video signal released from the controller, may be composed of an electrophotographic laser beam printer or an ink jet printer. 14 indicates a controller for realizing the various processes.

In FIG. 1, arrows indicate the data flow of various drawing information from the host computer 1 to the printer engine 13, with respectively corresponding tasks written thereunder. These tasks are executed as multiple tasks, with the following descending priority of execution according to the real processing time, i.e., engine task 84>rendering task 83>communication task 81>intermediate data generation task 82.

[Memory manager 85]

Figure 2:
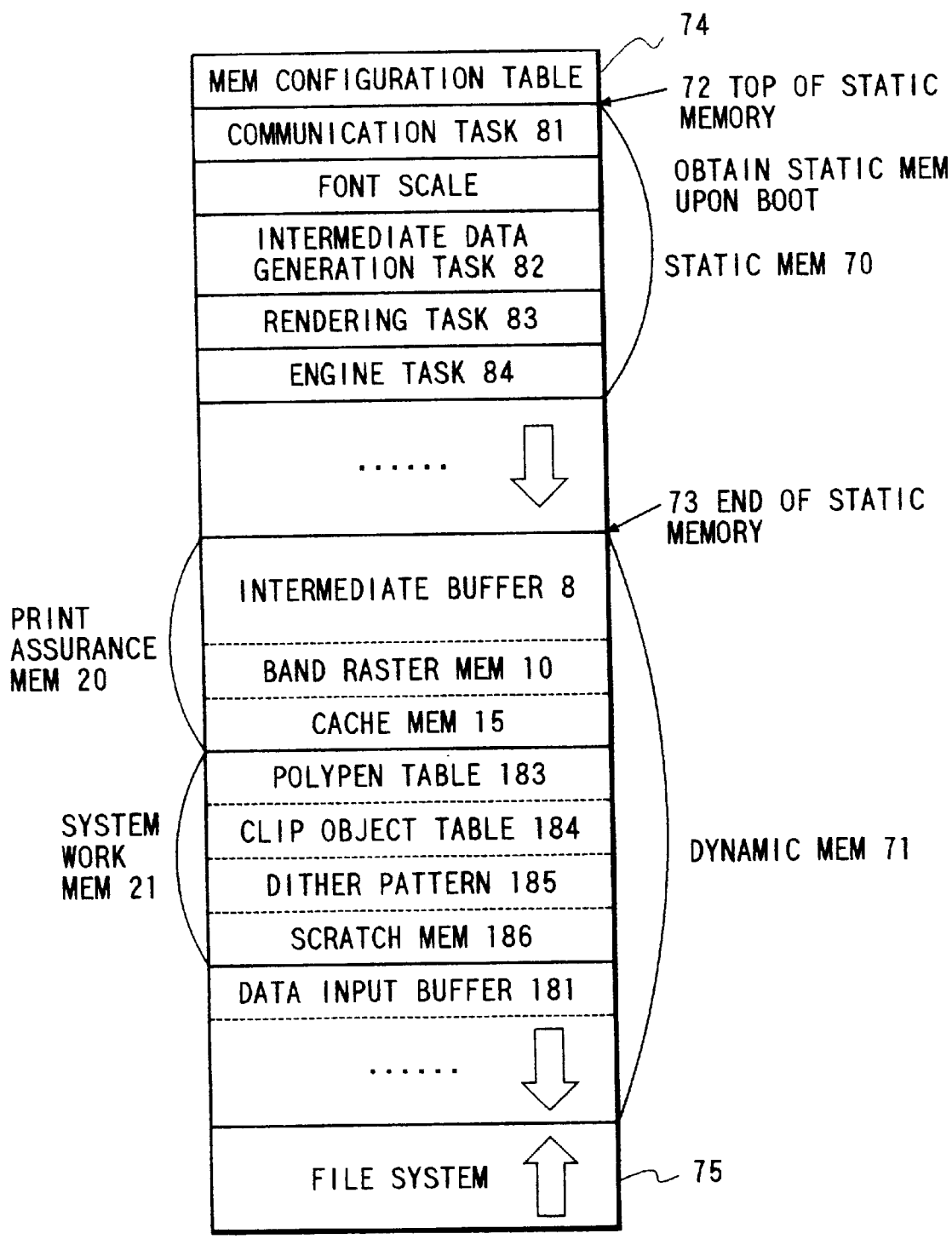
FIG. 2 is a view showing memory configuration in the above-mentioned embodiment.

The memory configuration of the management RAM 7, constituting the basic feature of the present invention, is shown in FIG. 2. In the following there will be explained, with reference to a flow chart in FIG. 3, a memory acquiring algorithm (function of the memory manager).

A step 701 diagnozes errors in the memories and hardwares as an initialization process for the printer, and, in case of any error, gives a warning of that effect and the sequence is terminated.

Then a step 702 designates memory sizes statically required by the tasks (memory sizes not dependent on the memory configuration or the emulating translator, and, once acquired at the start-up, retained until the power supply is turned off), and acquires such memory sizes from the memory manager.

More specifically, as shown in FIG. 2, the acquisition of the static memory is requested in the order that the initializing functions of the tasks are called, and the memory manager 85 assigns the memories in succession to the tasks 81 to 84.

After the initialization of all the tasks, the memory manager 85 memorizes the top address (72) and the end address (73) of the static memories.

In this initialization stage, the resource information, or a memory configuration table 74, of which method of utilization may be dynamically altered afterwards, is in a default state.

The default size of the band raster memory is determined in consideration of the system memory and the printing resolution (300 dpi in a quick mode and 600 dpi in a fine mode in the present embodiment).

Also a band height corresponding to the memory size is stored simultaneously in the memory configuration table 74.

Then a step 703 senses whether a request for state change has been entered by the user through the operation panel 4 (such as button depression or release, or input of a number) of the recording device, prior to the printing job.

If any change is requested, the request is analyzed and the corresponding information is stored, by overwriting, in the memory configuration table 74 (step 704).

As an example, an instruction for altering the memory resource may be given by a value for setting a print assurance memory (total size of the intermediate buffer 8, the band raster memory 10 and a cache memory) or a system work memory (total size of a polypen table, a clip object table, dither patterns and a scratch memory) in relation to the sheet size to be used in the recording device (such as A4, B4, A3, B4×2, A3×2, B4×3 or A3×3) or by a specific memory size value (for example ca. 2.6 MB to 26.6 MB).

Also the above-mentioned total size may be taken in an arbitrary combination within the dynamic table shown in FIG. 2 (including input buffer, cache memory, polypen table, clip object table, intermediate buffer, band raster memory, dither patterns etc.).

Also, within the dynamic memory shown in FIG. 2, including the input buffer, cache table, polypen table, clip object table, intermediate buffer, band raster memory, dither patterns etc., there may be designated only one (for example the band raster memory 10 or the intermediate buffer (object memory) 8).

A next step 706 detects whether a memory (resource) changing command (JL SET command) has been entered from the utility program on the host computer.

Such memory changing command may be given by a value for setting a print assurance memory (total size of the intermediate buffer 8, the band raster memory 10 and the cache memory) or a system work memory (total size of a polypen table, a clip object table, dither patterns and a scratch memory) in relation to the sheet size to be used in the recording device (such as A4, B4, A3, B4×2, A3×2, B4×3 or A3×3) or by a specific memory size value (for example ca. 2.6 MB to 26.6 MB).

Also the above-mentioned total size may be taken in an arbitrary combination within the dynamic table shown in FIG. 2 (including input buffer, cache memory, polypen table, click object table, intermediate buffer, band raster memory, dither patterns etc.).

Also, within the dynamic memory shown in FIG. 2, including the input buffer cache table, polypen table, clip object table, intermediate buffer, band raster memory, dither patterns etc., there may be designated only one (for example the band raster memory 10 or the intermediate buffer (object memory) 8).

As an example, in case a command as shown in FIG. 22 is entered, a step 704 is executed to calculate the necessary memory size, by referring to a table shown in FIG. 4 or 5.

For example, the approximate memory size is 5.2 MB for a sheet designation of an A4 size, 7.4 MB for B4 size, 9.6 MB for A3 size, 14.0 MB for B4×2 size, 18.0 MB for A3×2 size, 20.6 MB for B4×3 size, and 26.6 MB for A3×3 size.

A step 705 discriminates whether a job start command has been entered, and, if not, the sequence repeats the steps 703 to 706, but, if entered, the sequence proceeds to a step 708.

A step 708 acquires a memory area of a size variable for each job (hereinafter called dynamic memory). As in the case of the static memory, the dynamic memory is also requested to the memory manager 85, for each task requiring such dynamic memory, by referring to the memory configuration table 74.

The memory manager 85 acquires the dynamic memories in the order of requests, staring from the end of the static memory. In the dynamic memories shown in FIG. 2, the correspondence with the tasks is indicated by the tasks numbers 81–84.

For example, the intermediate data generation task 82 requires, to the memory manager 85, a total memory of three memory components (polypen table, clip object table and intermediate buffer), and assigns memory resources to these items from the dynamic memory acquired in the intermediate data generation task.

The band raster memory 10, constituting the main feature of the present invention, is formed by a dynamic memory assigned by the rendering task 83.

Finally, in the remaining part of the memory, a FS (file system) memory area is secured (step 709). This memory area is used for downloading the font and storing the form overlay and the macroinstructions in the page description language. The dynamic memories acquired by the tasks in the step 708 are released in a step 714 after the completion of the printing job.

On the other hand, the FS memory is not released after the job and is commonly used by the different printing jobs.

Thus, the file system memory is acquired, in the address space of the file system, from the end thereof, namely in a direction opposite to that of the static and dynamic memories, thereby achieving efficient garbage collection (step 713) after the dynamic memories are liberated.

After the memory acquisition, a step 710 analyzes the entered PDL data, and a step 711 executes the actual printing job according to the analyzed data. These steps will be explained in detail in the description of algorithm later.

If a step 712 discriminates that the job has been completed, the memories are released in an order opposite to that of acquisition.

As a result, the memory manger 85 is only required to memorize the lowermost address of the dynamic memory currently utilized.

Figure 11:
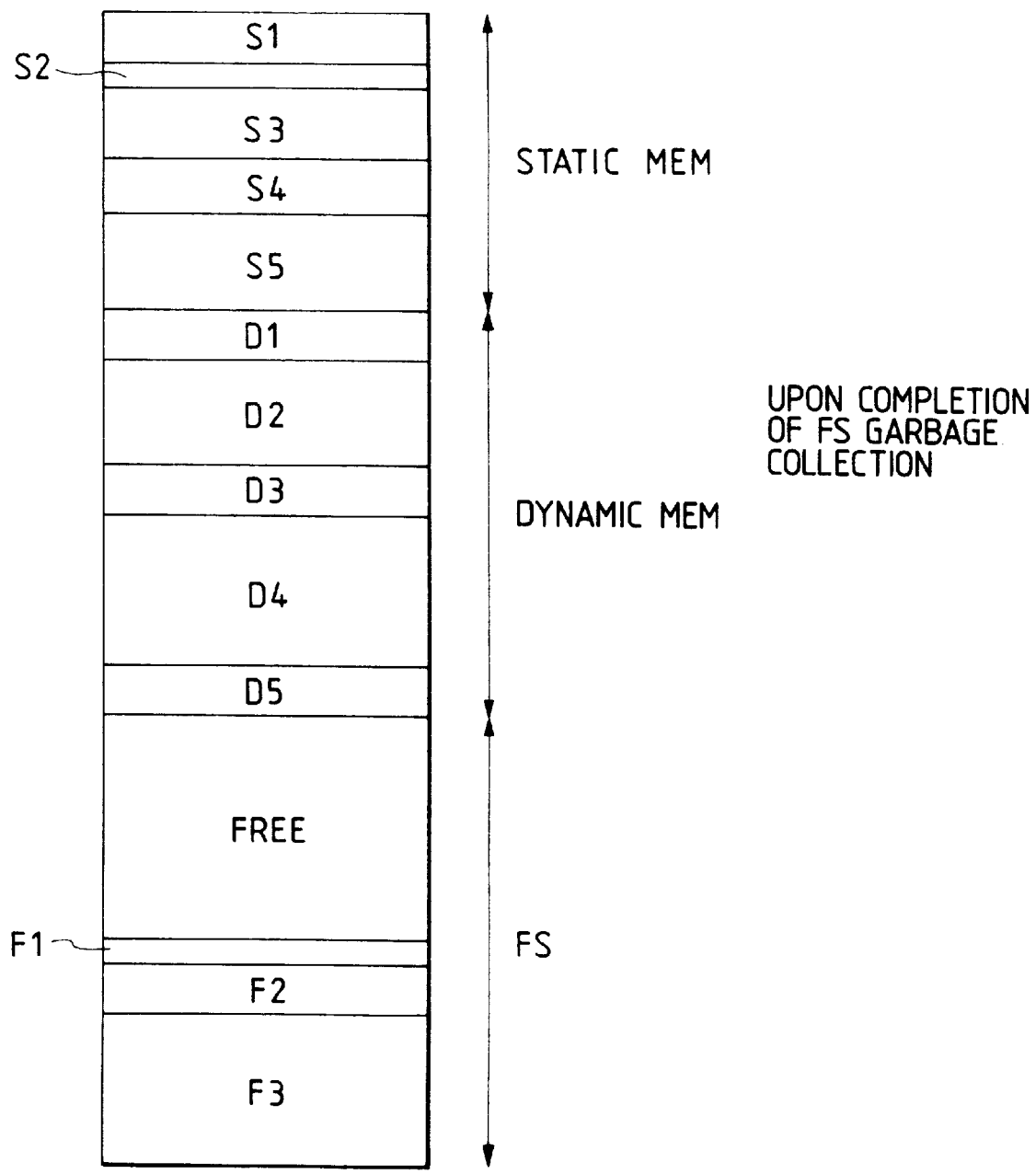
FIG. 11 is a view showing the memory configuration at the end of garbage collection for the FS memory.

A step 713 executes garbage collection of the memory acquired as the file system. In this embodiment, an object acquired in the file system is assigned to a space continuous from the end of the memory space, whereby a large free area is formed as a single file system (cf. FIG. 11).

As the FS object assumes a form of the FAT (file access table) commonly utilized in the memory disks, the garbage collection does not affect the user who utilizes the file system memory through the ID.

Figure 12:
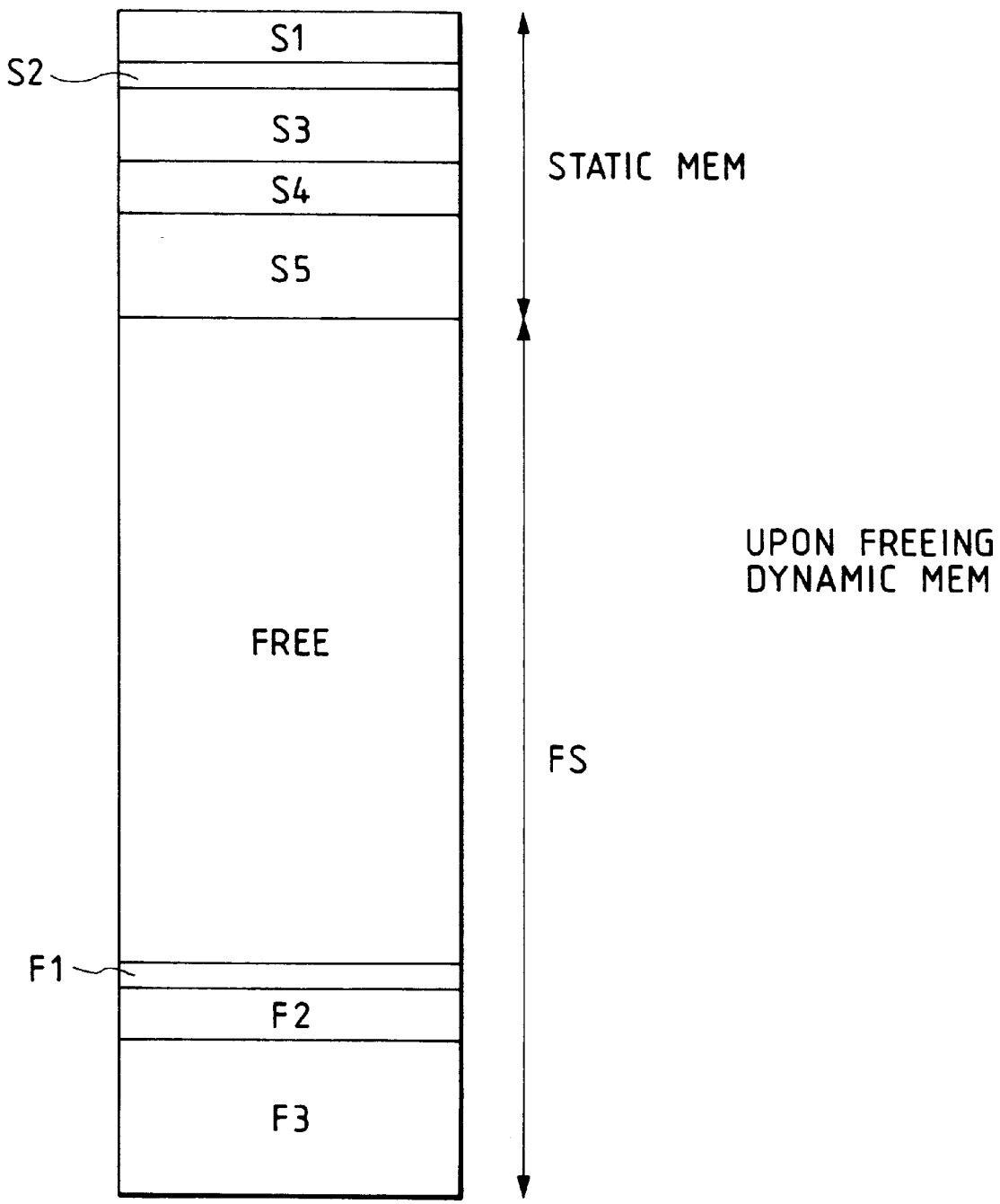
FIG. 12 is a view showing the memory configuration at the release of the dynamic memory.

Finally a step 714 releases the dynamic memories, by requesting, to the memory manager, the release of the memories in an order of tasks 84, 83, 82 and 81 which is opposite to the order of memory acquisition, whereby all the dynamic memories are released and handled as free areas of the file system as shown in FIG. 12.

Figure 13:
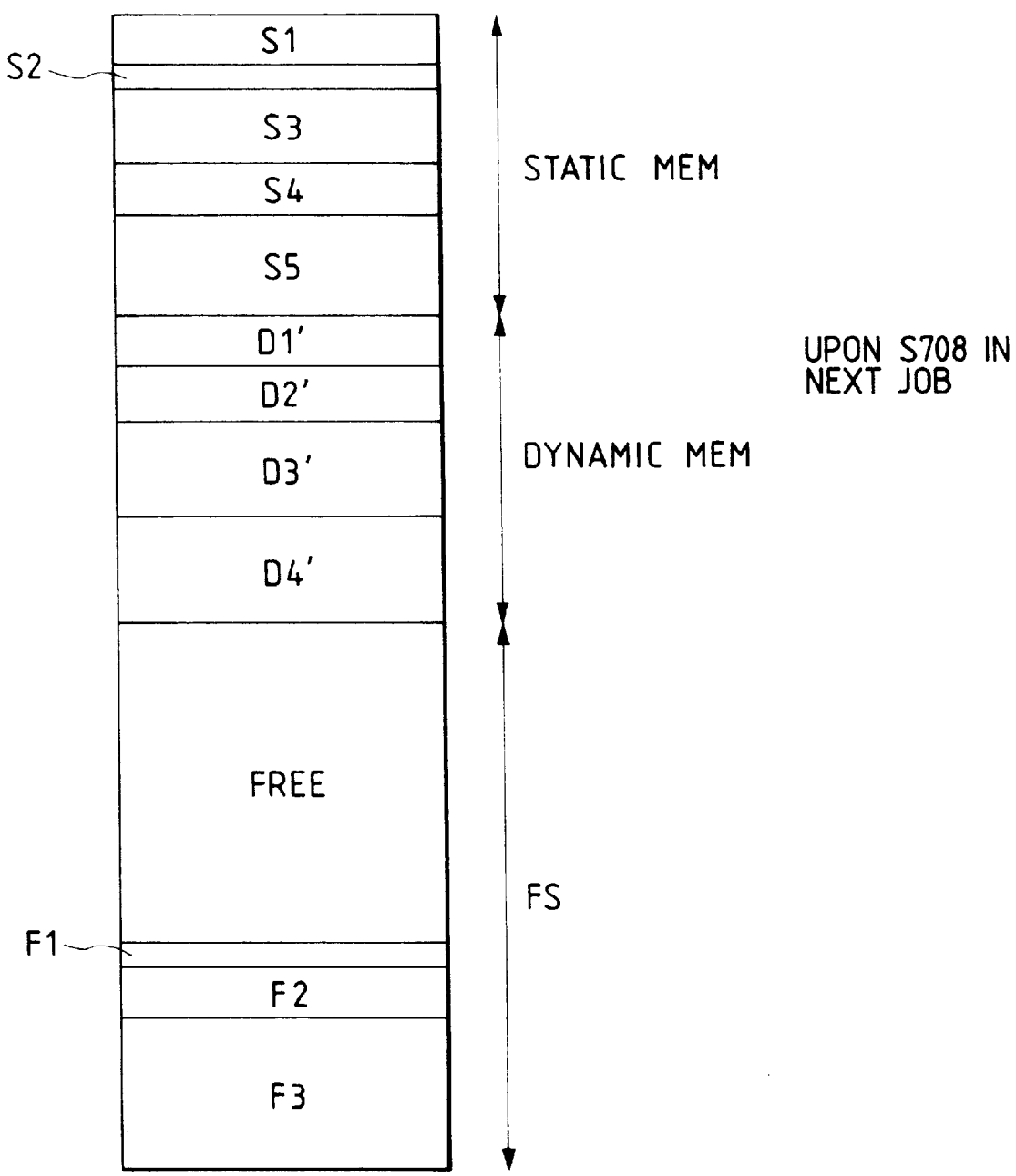
FIG. 13 is a view showing the memory configuration at the memory acquisition in a next job.

At the start of a new job, the step 708 acquires the dynamic memories from the top address of such free areas, whereby the memories assume a configuration shown in FIG. 13.

Figure 10:
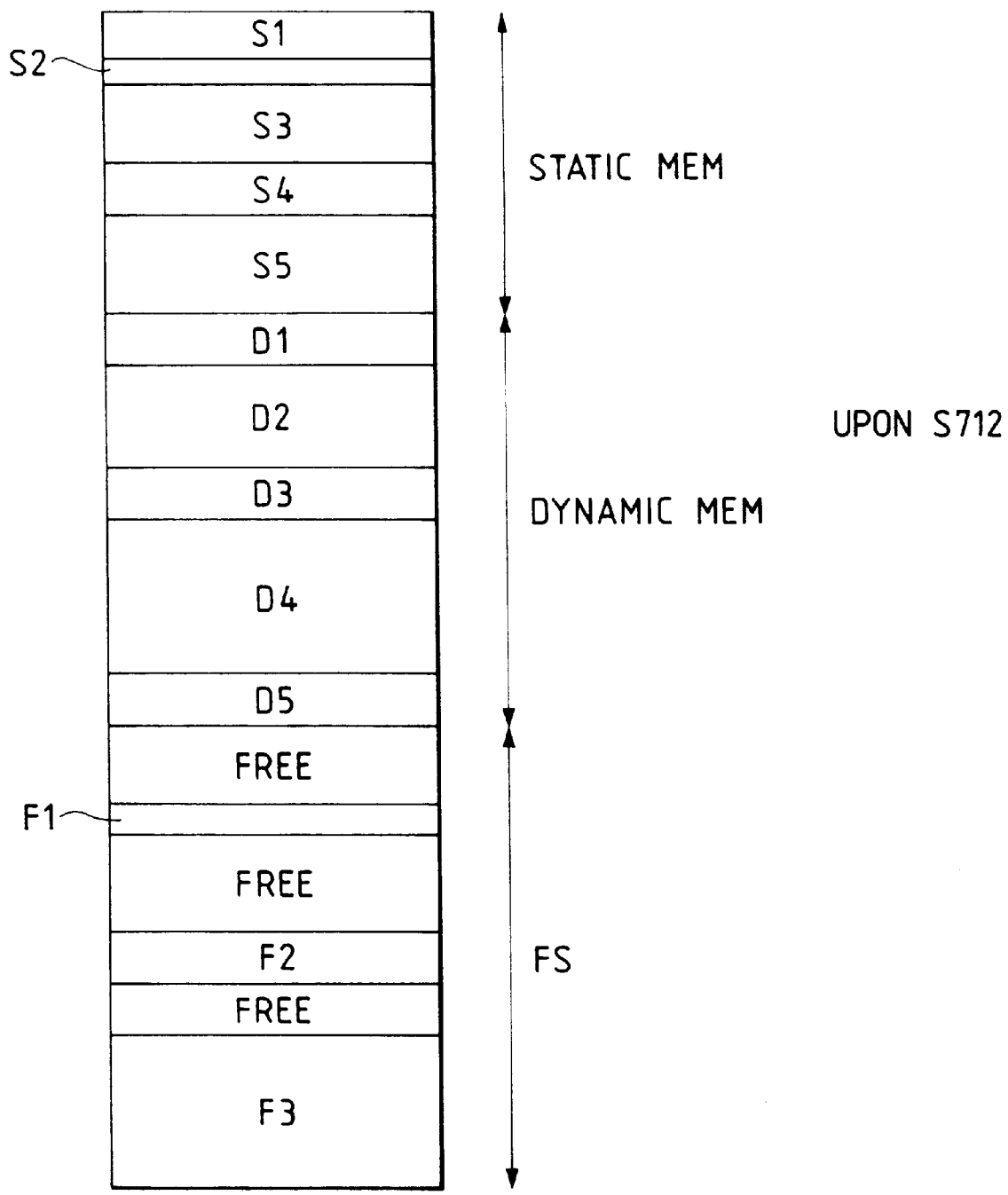
FIG. 10 is a view showing the memory configuration at a step S712 in FIG. 3.

Comparison of FIGS. 10 and 13 indicates a change in the configuration of the dynamic memories, and it will be understood that the memory configuration can be optimized according to the PDL job.

The memory manager for effecting the memory management explained above is only required to effect the memorization of the end address of the dynamic memories and the management of FAT and garbage collection in the file system, and can therefore be easily realized as a hardware.

[Print assurance memory]

As shown in FIG. 2, a combined memory area of the intermediate buffer 8, the band raster memory 10 and a font cache memory 15, for storing the scaled outline characters, is defined as a print assurance memory 20, corresponding to a memory size required for the maximum processable resolution.

More specifically, it represents the sheet size to which the printing can be assured with a resolution of 600 dpi by processing the PDL data.

In practice, the sheet size for which the printing resolution is to be assured and the actually required memory size are correlated as shown in FIG. 4.

In FIG. 4, a designation "unassured" means that the printing process with the resolution of 600 dpi cannot be assured with a sheet size equal to or larger than A4. Also a designation "B4*2" means that the printing with the resolution of 600 dpi can be assured for two sheets of B4 size, or for the top and rear faces in the two-side printing.

As an example, in case of printing the PDL data on an A3-sized sheet and in case the print assurance memory is secured only for the A4 size, the image output is possible with the maximum resolution of 600 dpi if the banding process is possible, but, if the banding process is not possible, there will be generated a process for reducing the resolution (degrading process) or a print over-run, resulting in a deteriorated print output.

The memory size for the A4 size is 5.2 MB, because 4 MB is required for a full A4-sized bit map memory for ensuring the A4-sized one-side printing with 600 dpi, and 1.2 MB is required for the intermediate data memory area and the font cache area.

Also the memory size for the A3 size is to ensure the A3-sized one-side printing with 600 dpi, or the A4-sized two-side printing (4M×2+α) with 600 dpi.

The memory size mentioned above provides assurance including the case where the banding process is not possible. If the banding process is possible, for the printing operation with the resolution of 600 dpi on a vertically fed A4-sized sheet, the band raster memory 10 for a height of 512 lines only requires a capacity of (512×210×600/25.4)×2/8≅524 KB, and the remaining area can be used for storing the intermediate data and the font cache information.

FIG. 5 shows the relationship among the print assurance memory, the memory sizes on the printer and the designatable memory sizes. For each memory size, the default print assurance size is indicated by an asterisk (*). Thus, when "Auto" is set for the print assurance memory 20, the memory size with the asterisk is automatically selected.

[System work memory]

The system work memory 21 is a work area for the printing process of the PDL data, and is composed of an assembly of a polypen table 183, a clip object table 184, a dither pattern 185, a scratch memory 186 etc. to be explained in the following.

An increase in these work memory areas allows to support the patterns with a larger width, to achieve high-speed drawing of a more complex object, and to process of a dither pattern of a larger size.

A The size of the system work memory has a base unit of 200 KB, and is increased as shown in FIG. 6 with an increase in the available memory size.

In FIG. 6, the asterisk (*) indicates the default system work memory size at the "Auto" mode.

[Panel input]

Figure 7:
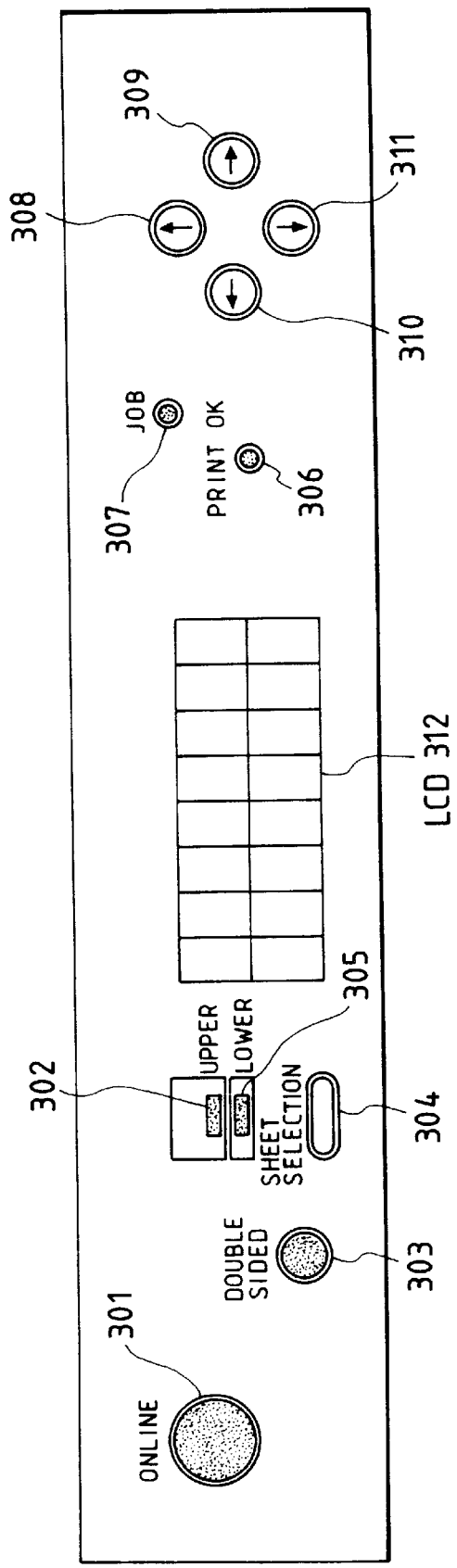
FIG. 7 is a detailed view of an operation panel.
Figure 8:
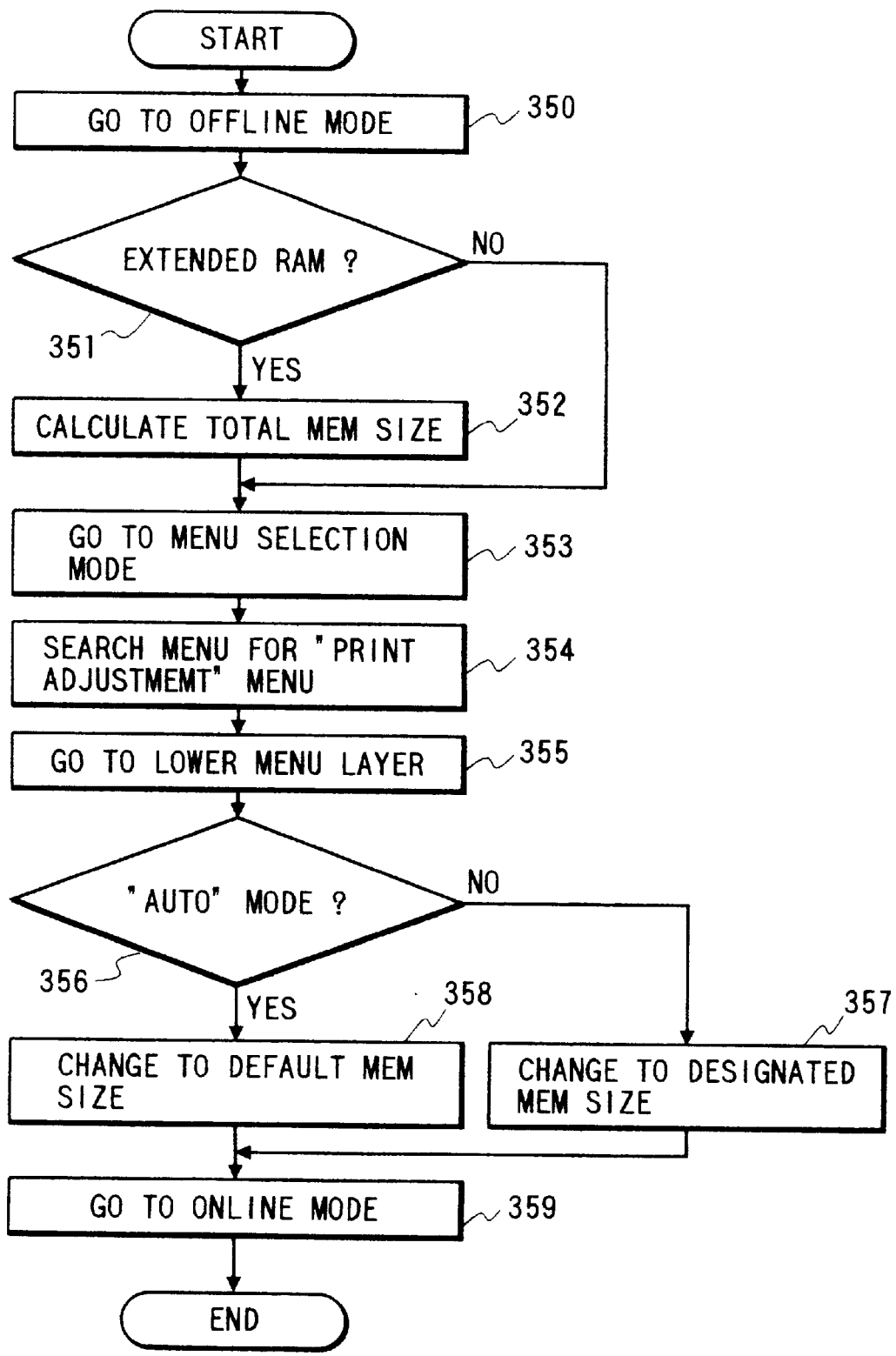
FIG. 8 is a flow chart of a panel input process.
Figure 9:
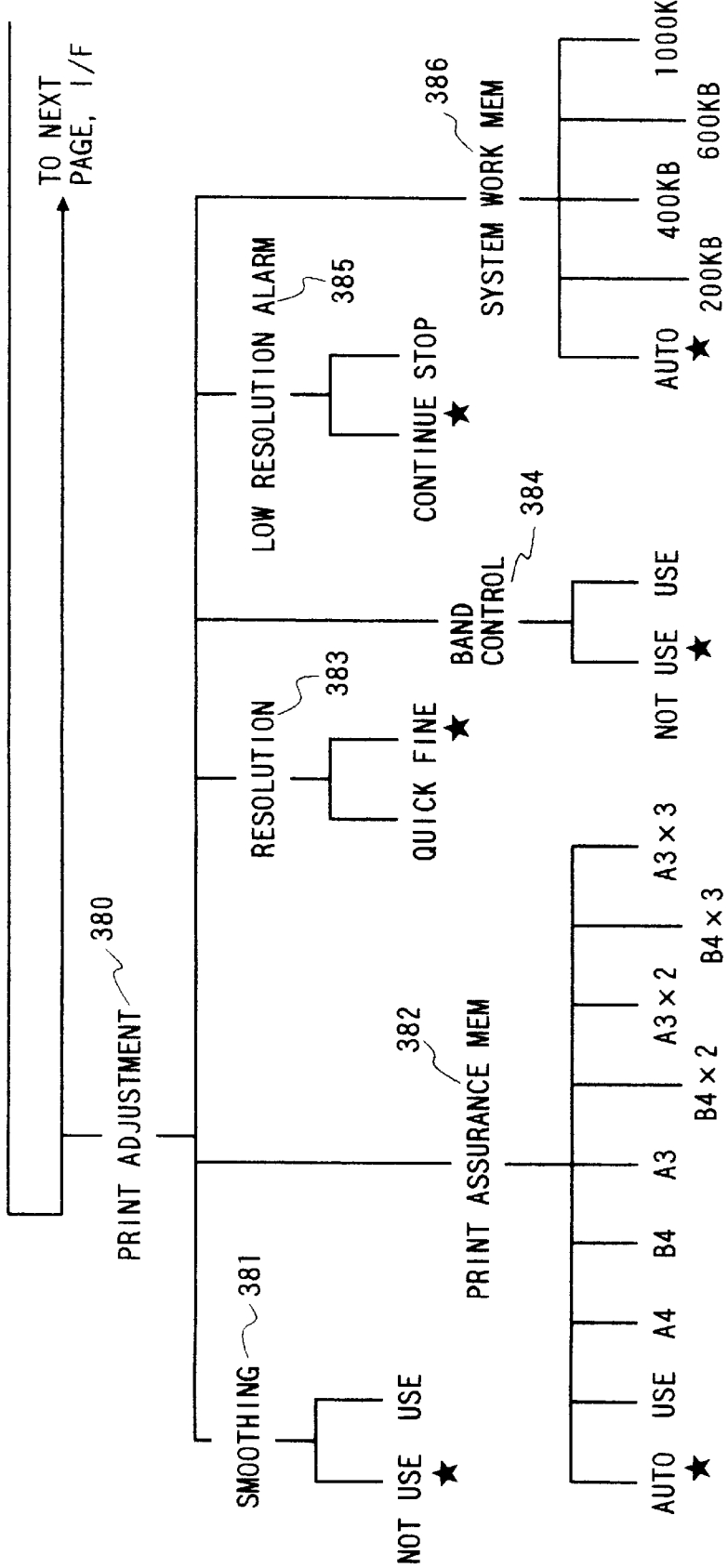
FIG. 9 is a view showing the hierarchy of panel inputs in the above-mentioned embodiment.

In the following there will be explained the panel input process in the step 703 in FIG. 3 (for example for varying the size of the print assurance memory 20 and the system work memory 21), with reference to FIG. 7 showing the detailed arrangement of the panel, FIG. 8 showing a flow chart and FIG. 9 showing the hierarchy of the panel. The operations explained in the following are applicable also to the command input process in the step 706.

At first, in response to the depression of an on-line key 301 shown in FIG. 7, the system shifts (step 350) to an off-line state where the data from the host computer 1 are not accepted, and there is discriminated whether an extension RAM is connected to the expansion I/F 5 (step 351).

If it is connected, the total size (4–36 MB) of the standard area of 4 MB in the management RAM 7 and the connected extension RAM is calculated and is registered in an unrepresented memory size counter (step 352).

If the extension RAM is not connected to the expansion I/F 5, the standard area of 4 MB of the management RAM 7 is registered in the unrepresented memory size counter.

The above-mentioned steps 351 and 352 may also be executed in advance at the start of power supply to the it printer device.

Then, a menu selection mode is assumed (step 353), in response to the depression of a leftward arrow key 310.

Then, in response to the continued depression of the leftward arrow key, the menu is searched until a "print adjustment" menu 380 shown in FIG. 9 appears on an LCD 312.

Then, the menu level is shifted to a lower level by the depression of a downward arrow key 311, and a menu hierarchy of a print assurance memory 382 or a system work memory 386 shown in FIG. 9 is selected by the depression of a leftword arrow key 310 or a rightward arrow key 309. Subsequently the downward arrow key 311 is depressed again to shift the menu hierarchy to a further lower level (step 355).

Then the memory sizes acquirable for the selected memory item (for example "Auto", "200K", "400K*", "600K" and "1000K" in case the system work memory is selected for a total memory size of 8 MB) are selectively displayed on the LCD 312 through the operations of the right- and leftward arrow keys 309, 310, and there is discriminated whether the "Auto" mode is designated by the depression of the downward arrow key 311 (step 356).

The sizes of the print assurance memory and the system work memory, displayed on the LCD 312, are determined according to the maximum settable value depending on the loaded memory and the available dynamic memory size as shown in FIGS. 5 and 6.

If the "Auto" mode is designated in the step 356, the memory size is set at the default value determined in advance according to the total memory size registered in the step 352 in the unrepresented memory size counter (step 358).

For example, if the step 355 selects the print assurance memory and the step 356 selects the "Auto" mode, the default memory size is selected according to the table shown in FIG. 5. If the step 355 selects the system work memory and the step 356 selects the "Auto" mode, the default memory size is selected according to the table shown in FIG. 6.

In case the "Auto" mode is selected for the print assurance memory from the operation panel, an asterisked memory size shown in FIG. 5 is selected, but a smaller memory size than the default value for the "Auto" mode may be selected if the size of the system work memory is selected larger than the default value.

The memory size can be selected within the following condition:

$$S+W+R+F \leq M \qquad (1)$$

wherein R is the print assurance memory size, W is the system work memory size, S is the static memory size, F is the assurance size of the file system and M is the size of the loaded memory.

Also in case the step 356 does not select the "Auto" mode but selects another memory size (for example 200K in the selection of the system work memory for a total memory size of 8 MB), the memory size is set at such selected value.

When the variation in the memory configuration is finally completed, the on-line state is restored in response to the depression of the on-line key 301, whereby the subsequent printing job is rendered acceptable and the present process is terminated (step 359).

[Example of a variable-length RAM area]

In the following there will be explained the selection of the variable ones among the parameters (memory resources) and the principle of determination of the memory sizes.

(Data input buffer)

This parameter designates the size of the input buffer 2 for storing the data transferred from the host computer 1. A larger buffer size allows to buffer the input data of a certain amount even when the data analyzing speed of an interpreter 120 to be explained later is low, and can therefore reduce the probability and the time for issuing busy signals for suspending the data input from the host computer.

Thus the buffer size is preferably selected larger in case of processing a large amount of image data, in case of a highly advanced graphic process or in case the host I/F is capable of high-speed jobs.

(Cache table)

This table is used for cache storage of the characters (in the form of bit map font after scaling of the outline font), and the size of this table is determined according to whether the characters are processed in a 2-byte format, a 1-byte format or in a BM format. The size of this table decreases in this order.

(polypen table)

This table is used, in drawing a line with a certain width, for approximating the edges of the line with polygons, and a larger memory size is required for the output of larger line width.

This memory can be dispensed with if the line does not require a high precision of approximation.

(Clip object tale)

The information required for ordinary rectangular clipping is limited to several tens of bytes, but a larger memory size is required for the information in case of clipping with an arbitrary polygon.

This memory can be made small in simple line printer-like applications, but has to be made larger for utilizing arbitrary clipping in complex DTP applications.

(Intermediate buffer)

The intermediate buffer 8 is used for storing the intermediate data (object data) generated from the input PDL data stored in the input buffer 2.

(Band raster memory)

The size of this memory corresponds to twice of the band height in the banding process to be explained later. If a sufficient memory capacity is available, this memory size may be increased to reduce the frequency of print over-run or degrading.

(Dither pattern)

This memory area is required, in a PDL supporting multi-value image data, corresponding to the largest dither matrix.

This memory area is not necessary in a PDL which does not support the multi-value image data.

[Example of a variable-length band raster memory]

The memory configuration in the one-side printing can be represented by:

$$TM=BM+PM+SM+FM$$

wherein BM is the band memory size, TM is the total memory size, PM is the size of the dynamic frame memory, SM is the fixed static memory size, and FM is the file system size. Also the printing resolution is indicated by REZ.

With an increase in the band memory size, the size PM has to be decreased, whereby the probability of time degrading decreases but that of memory degrading increases. This is effective for avoiding the time degrading in case the characters etc. are concentrated in a certain band.

On the other hand, a decrease in the band memory size decreases the frequency of memory degrading and increases the frequency of time degrading. This is effective for example to bit map data.

In the following there is considered a default configuration when the printing resolution REZ is reduced to ½.

For conditions:

REZ(600): band_height (600), band_width (600)

REZ(300): band_height (300), band_width (300)

there are selected as default values:

band_width (300)=band_width (600)/2 band_height (300)=2*band_height (600).

As a result, the band memory can cover, with a theoretically same memory size, a sheet area in 300 dpi, which is four times of the area in 600 dpi, thereby reducing the frequency of time degrading.

It is also possible to reduce the frequency of memory degrading by a decrease in the band memory size, without increase in the possibility of time degrading.

In the two-side printing, a larger PM size is required for increasing the throughput and for the jam recovery, and the default BM size has therefore to be reduced.

Such and still other parameters are recorded as default values in the database, for enabling the user to modify the set values for each job.

[Printing algorithm]

Figure 14:
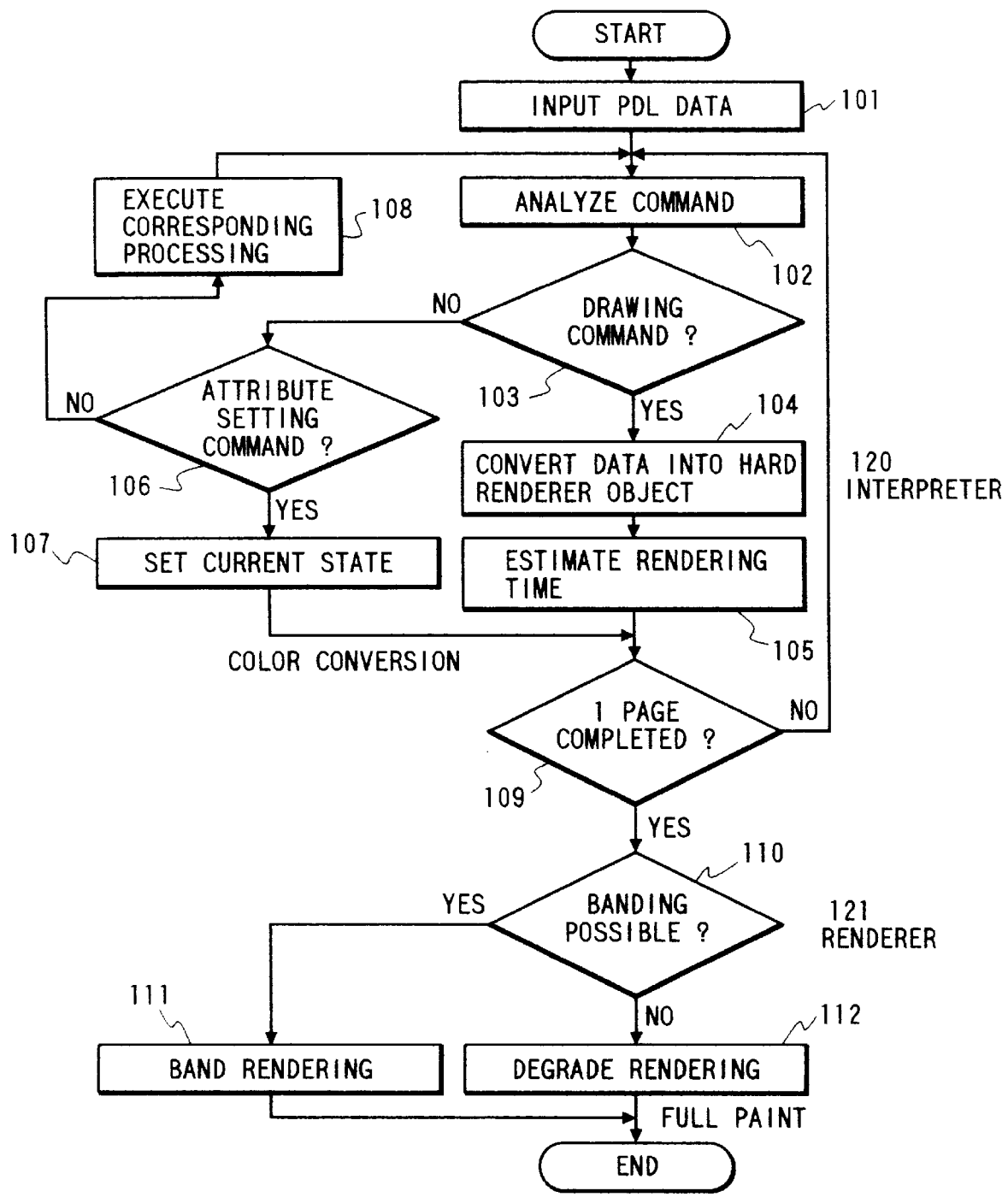
FIG. 14 is a flow chart showing an algorithm for an interpreter and a renderer in the PDL.

In the following there will be outlined, with reference to FIG. 14, the algorithm of PDL data analysis and printing, after the acquisition of the print assurance memory 20, the system work memory 21 and other necessary memories.

At first a step 101 fetches the PDL data in the input buffer 2 for example by an interruption process, and a step 102 analyzes the entered PDL command according to the language specification.

There is required a mechanism for automatic discrimination of the entered PDL, by judging the first several hundred bytes of the input PDL data.

After the discrimination of PDL, if the PDL command is analyzed to indicate that the PDL data are a drawing command, for example for drawing a character, a vector or an image, a step 104 effects conversion of the PDL data into intermediate data of a page object format supported by the hardware (or software) and the rendering circuit 9 and stores such intermediate data in the intermediate buffer 8.

[Rendering model]

Figure 15:
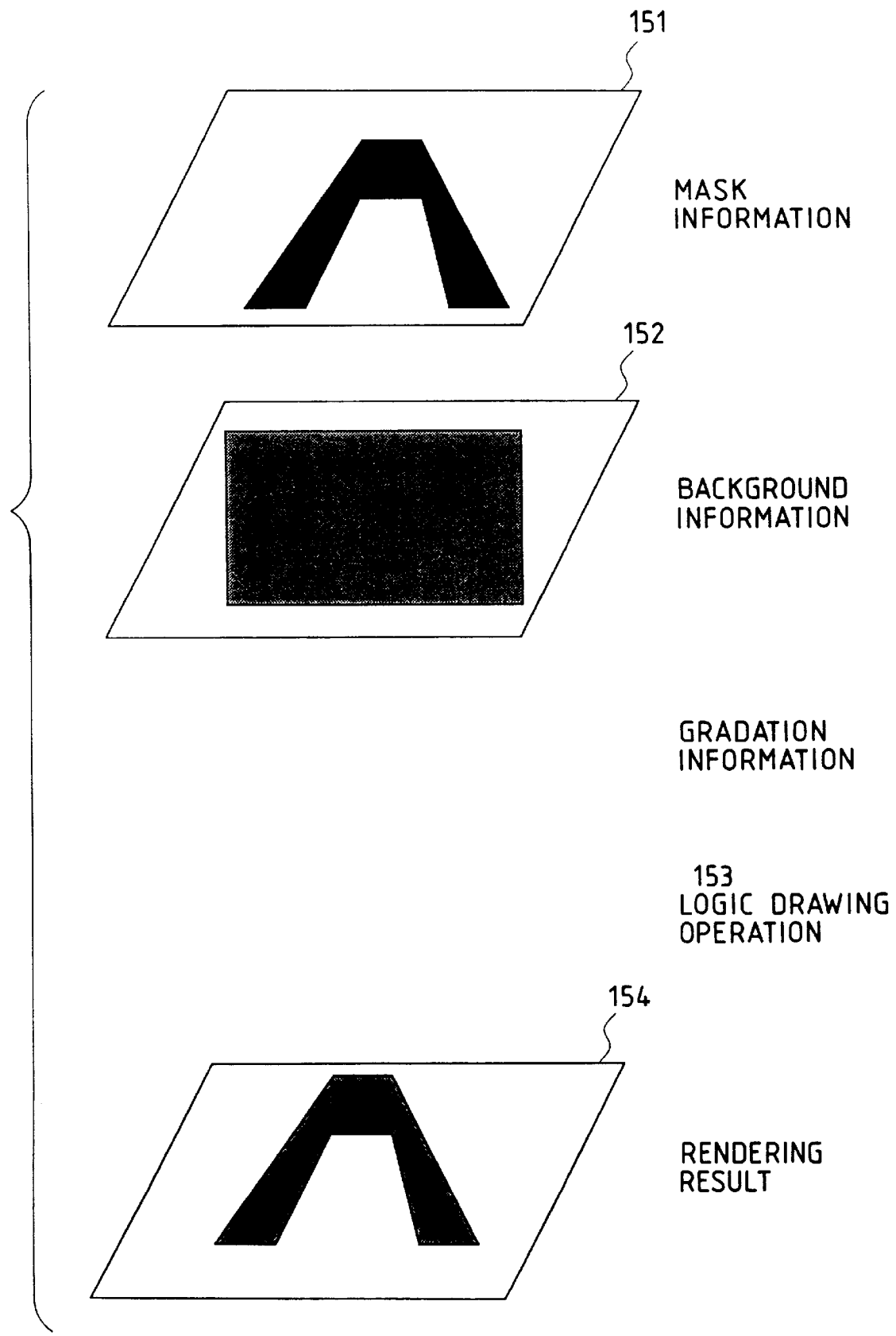
FIG. 15 is a view showing an imaging model.

For facilitating the understanding of the following description, the rendering model of this embodiment will be briefly explained with reference to FIG. 15.

This model is composed of three components, namely 1-bit mask information 151 indicating the geometrical information of the drawing data, representing the part to be drawn, background information 152 indicating the pattern to be used for painting the mask, and a logic drawing method 153 (SET, OR, XOR, BLEND, ADD etc.) between the source and the destination, and the corresponding result of rendering is indicated by 154.

[Mask]

The mask information supported in the present embodiment includes, for example, a run length (run information in each scanning line in the X-direction), convex polygons without edge crossing, a bit map image and a bit map font.

Figure 16:
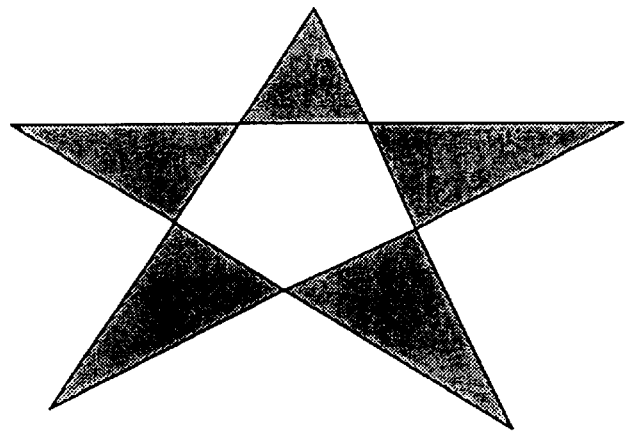
FIGS. 16 to 19 are schematic views showing various mask information.
Figure 17:
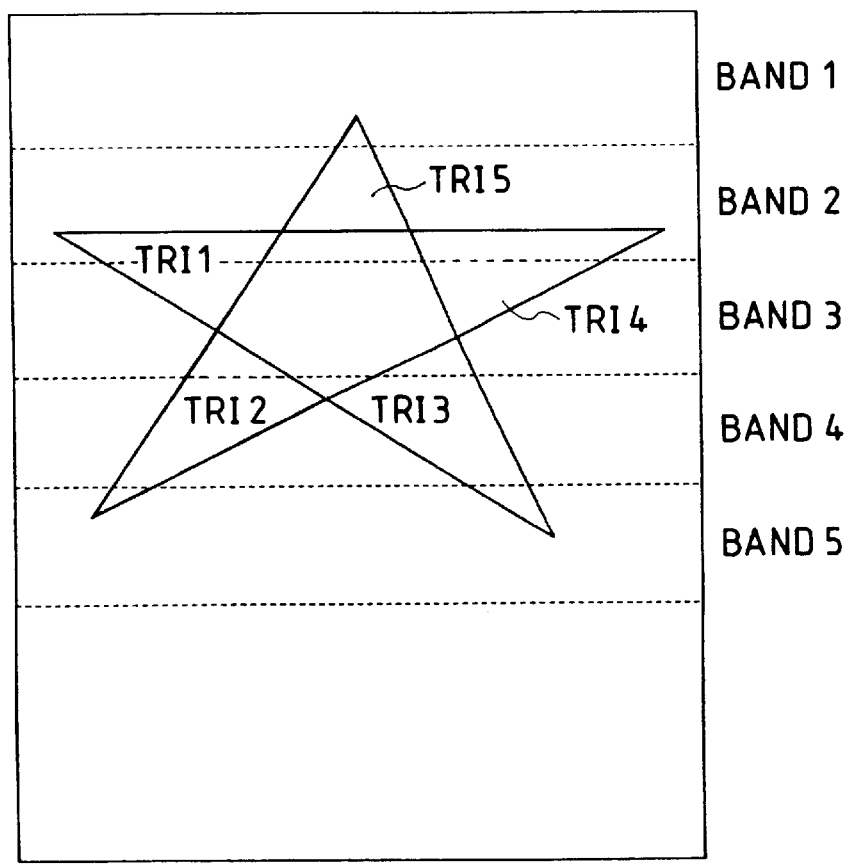

Such mask information is so formed as to be adaptable for high-speed hardware rendering. As an example, a pentagon shown in FIG. 16 is divided, in the step 104, into non-crossing five triangles as shown in FIG. 17. (In this example, the pattern painting is conducted by the even-odd rule.)

Figure 18:
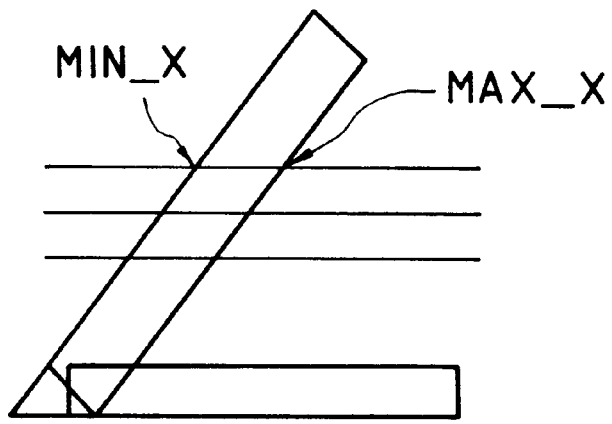

Also in processing a connecting portion of lines as shown in FIG. 18, the data is developed in the work area of the management RAM 7 by the DDA algorithm, in consideration of the line connection information X(round, miter, triangle), and the final external shape is retained in the run length format, with (min x) and (max x) as paired information in each scanning line in the Y-direction, for use in the subsequent high-speed rendering step 110.

Figure 19:
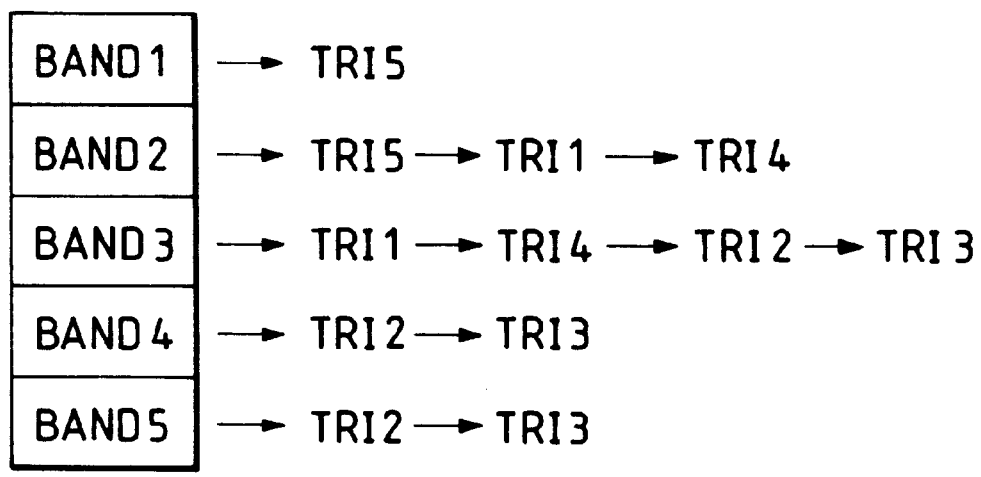

For executing the banding process, or the rendering processing with a memory size smaller than the full-page memory size, each mask object finally generated is divided into plural bands (height of each band being preferably an exponent of 2, most preferably 512 dots), and, in each band, the mask objects are sorted and formed into a link list as shown in FIG. 19.

For mask information extending over plural bands (for example polygon shown in FIG. 17), the polygon information is held commonly among the bands.

For the mask divided to each band, a step 105 adds a data decoding time, required at the rendering operation, and a rendering time, at the preparation of a page object (intermediate data) in each band.

This information is retained for each band i, as [pred_decode(i), pred_render(i)]. The decoding time is approximately proportional to the data amount of the generated object.

However, the decoding time for the triangle 1 or 4 in the band 3 requires an additional time for determining the offset of the starting point of polygon in the band 3, from the starting point of polygon in the preceding band 2.

The rendering time is determined by [foreground calculating time]×(color depth×color plane number of the background)×[calculation factor according to the kind of logic drawing]. Also the foreground calculation time is determined by [object decoding time]+(decoding time for each line+word number of mask in the X-direction)×(height). The parenthesized factors are effective in a color printer.

Again referring to FIG. 14, if the input data is not a drawing command, a step 106 discriminates whether the data is an attribute (background, logic drawing) setting command.

If so, a step 107 executes a corresponding process, for conversion into a data format (page object) that can be read by the hardware (or software) renderer.

Certain commands, such as flood fill, cannot be processed by band rendering. Therefore, in response to the detection of such command, there is set a full-paint flag (full-p-flag). As a result, a step 112 forcedly reduces the printing resolution, whereby the rendering is conducted in a full-paint (degrade) mode.

For this purpose, the rendering process is ordinarily conducted with a resolution of 600 dpi and the object resolution is reduced to 300 dpi if the rendering time is insufficient. In such situation, the band raster memory 10 and the intermediate buffer 8 require a total size at least corresponding to the maximum sheet size at 300 dpi.

[Background]

The background information indicates the pattern to be given to the mask. The background includes a background pattern given to the mask without image repetition and a tile pattern in which a pattern is repeated in the vertical and horizontal directions.

As the present embodiment contemplates a black-and-white printing device, the image, tile and gradation are given as black-and-white information, but expansion to color information can be easily achieved.

A step 108 effects a dumping process of the current state, for example, for debugging. A step 109 discriminates whether the PDL command analysis by the interpreter 120 (or intermediate data generation task 82) has been completed for a page, and, if completed, the sequence proceeds to a rendering task 83 in a step 121, but, if not, the sequence returns to the step 102 to repeat the analysis for a next command.

The process up to this point constitutes a data filtering task from the PDL data into the page object (intermediate data), and the subsequent process constitutes a rendering task for raster drawing in the band raster memory 10.

Since these tasks, particularly the latter, require real-time processing, they are realized as separate tasks in the real-time operation system, with the latter being given a higher operation priority.

[Band rendering]

A step 110 discriminates, as a pre-process of page object rendering, whether the band rendering (or banding) process is possible.

The banding process is not possible in the following cases:

(1) The "flood fill" command, etc., exists in the page;

(2) The frame information of the management RAM 7 overflows (memory degrading) because of input of a large amount of data; and (3) In the case of an electrophotographic laser beam printer or an LED printer, the banding process has to be conducted in parallel to the video signal transfer to the printer engine 13, once the recording operation is started by the feeding of the recording sheet. In such situation, the rendering time (pred_decode(i), pred_render(i)) calculated for each band in the step 105 exceeds a predetermined threshold (time degrading).

The banding process cannot be executed in any of these situations. In such case, in order to secure a full-paing memory corresponding to the sheet size, in the band raster memory 10 and the intermediate buffer 8, the currently existing intermediate data are rendered with a reduced resolution, and with the erasure of the object.

On the other hand, the above-mentioned condition (3) does not necessarily apply to a printer in which the head movement can be controlled by the controller, such as a thermal ink jet printer, and, even when the rendering speed becomes lower, the banding process is still possible by delaying the head movement.

Figure 20:
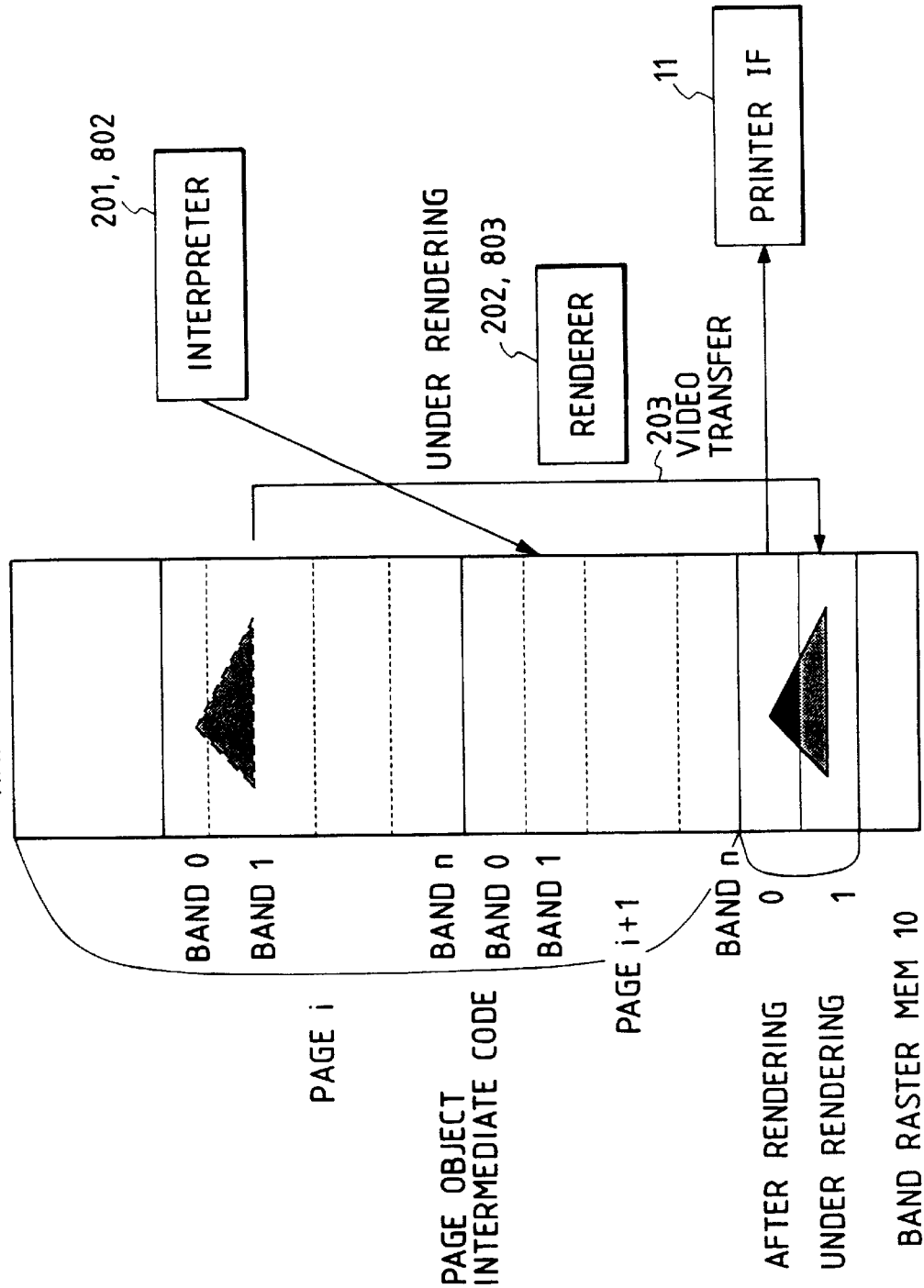
FIG. 20 is a view showing the concept of band rendering.

Now the banding process will be explained further with reference to FIG. 20. The band rendering is executed by reading page object information (intermediate data) generated by the PDL analyzing task 120 (or intermediate data generation task 82) in the management RAM 7 by means of the hardware or software renderer 9 activated by the rendering task 202 (or 83), extracting the scanning line information (xmin, xmax) in the Y-direction from the mask information, and storing, in the band rester memory 10, the corresponding background information, determined with reference to the current background information and logic drawing mode.

The rendering operation is executed by varying the Y coordinate so as to cover all the masks.

[Shipping in banding]

While the hardware executes the rendering process for the page object of a band i according to the mask information, background information and logic drawing method, it transmits the band information of an already rendered band i–1, as a video signal, through the printer I/F 11 and in synchronization with the horizontal sync signal supplied from the printer engine 13.

[Degraded rendering]

The PDL, data that cannot be processed by the band rendering are subjected to a degraded process according to the following algorithm.

[Conversion of resolution of page object]

As the degraded process is incapable of real-time rendering, the rendering is executed on the buffer 10 with a lowered resolution.

As the rendering hardware 9 is designed for a simpler high-speed process, it cannot execute real-time conversion of the resolution on the run length or on the convex polygon information.

Consequently, the following processes have to be executed prior to the rending process.

For example, in case of reducing the resolution from 600 dpi to 300 dpi, the run lengths for two lines are collected and the vertex information for the convex polygonis recalculated, as the pre-processes for rendering. Such pre-processes are executed by the interpreter task 201, for all the mask information in the page buffer.

The starting and ending X-coordinates of a run length obtained by the skipped scanning with 300 dpi are represented by:

$$\text{new\_xl}(i)=\min(xl(i), xl(i+1))/2, \text{ new\_xr}(i)=\max(xr(i), xr(i+1))/2$$

and the Y-coordinate becomes i/2, wherein xl(i), xr(i), xl(i+1) and xr(i+1) are respectively the starting and ending X-coordinates in two lines i and i+1 in the scanning with 600 dpi.

As for an image, the image information of the page object does not change but the scaling factors in the X and Y directions are respectively multiplied by ½.

[Recording device 13]

Figure 21:
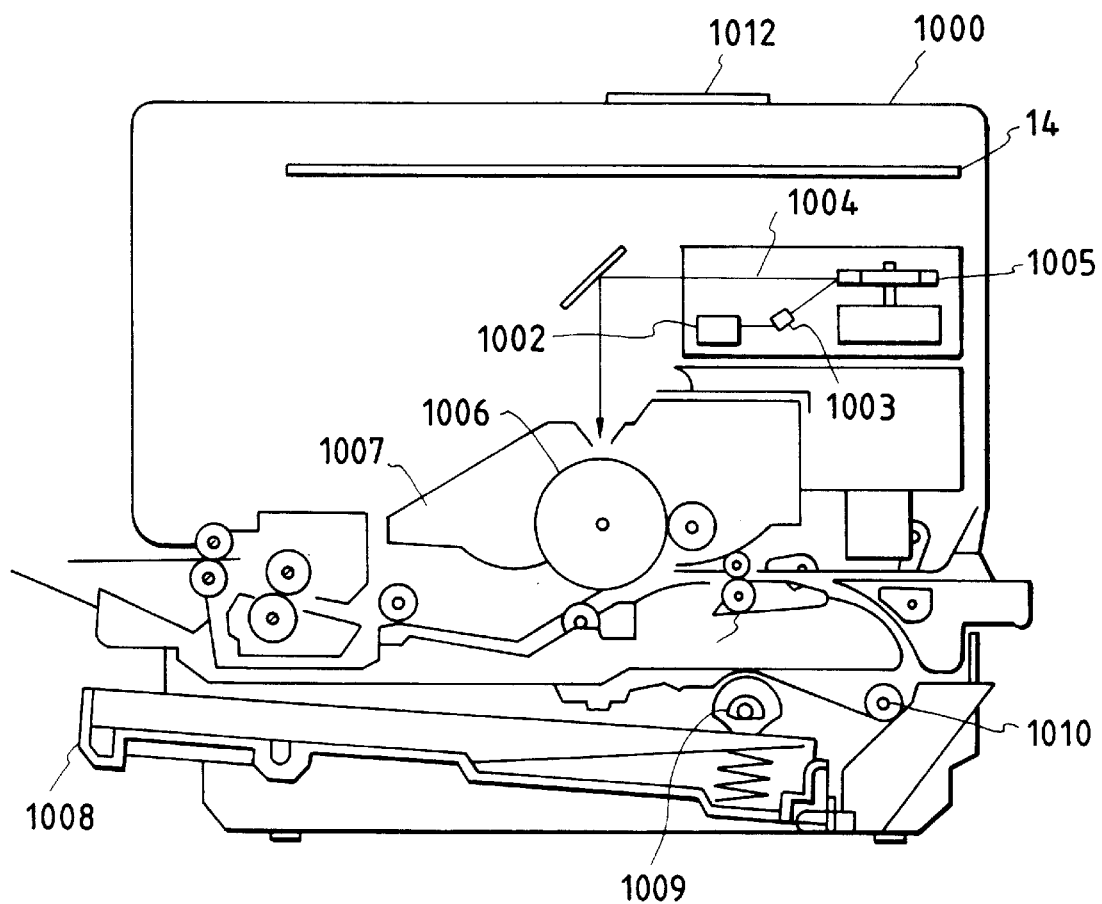
FIG. 21 is a cross-sectional view of a recording apparatus.

FIG. 21 is a schematic view of a laser beam printer (LBP) in which the present embodiment is applicable and which can also be used as the printer engine 13 in FIG. 1. In FIG. 1, controls other than that for the printer engine 13 are accommodated in the printer controller 14.

The first embodiment of the present invention is applicable not only to a laser beam printer but naturally also to the printers of other types.

A main body 1000 of the LBP receives and stores print information (character codes etc.) and input data (for example PDL) such as form information or microinstructions, supplied from an externally connected host computer, and generates output data (bit map data) such as character patterns and form patterns according to such received information, thereby forming an image on a recording medium such as a recording sheet.

An operation panel 1012 is provided with operations switches and an LED unit. A printer controller 14 controls the entire LBP 1000 and analyzes the character information etc. supplied from the host computer.

The printer controller 14 effects conversion principally of character patterns into a video signal of corresponding character pattern, or vector information, for supply to a laser drive 1002.

The laser driver 1002, for driving a semiconductor laser 1003, effects on-off switching of a laser beam 1004 emitted from the semiconductor laser 1003, according to the entered video signal. The laser beam 1004 is deflected in the lateral direction by a rotary polygon mirror 1005, thereby scanning a photosensitive drum 1006.

As a result, an electrostatic latent image of the character pattern is formed on the photosensitive drum 1006, and is rendered into a visible image by a developing unit 1007 positioned around the photosensitive drum 1006 and is transferred onto a recording sheet.

The recording sheet consists of a cut sheet, which is contained in a sheet cassette 1008 mounted on the LBP 100. The sheet is advanced from the cassette into the LBP 100 by means of a feed roller 1009 and transport rollers 1010, 1011 and supplied to the photosensitive drum 1006.

The image developed and transferred onto the sheet by the photosensitive drum 1006 and the developing unit 1007 is subjected to fixation in a fixing unit 1013, and the sheet is then discharged.

In the embodiment explained above, it is also possible to have the default values for the print assurance memory 20 and the system work memory 21 for each PDL among multiemulation PDL's and to acquire the dynamic memories according to such default values unless otherwise designated from the panel or from the utility.

Also in the foregoing embodiment, the memory size is made variable for the print assurance memory and the system work memory only, but it is also possible to make designation of the memory size in a smaller unit. For example, within the print assurance memory 20, the intermediate buffer 8, the band raster memory 10 and the font cache memory 15 may be individually designated from the panel or the utility.

According to the present embodiment, as explained in the foregoing, if the print assurance memory is set at the "Auto" mode with a calculated RAM size of 12 MB, an A3 size (9.6 MB) is automatically set.

Also if the system work memory is set at the "Auto" mode with a calculated RAM size of 12 MB, 600 KB is automatically set (cf. FIG. 6).

Consequently the user can utilize the information processing apparatus with default setting matching the loaded memory size, and can also control the memory size for printing by the setting from the operation panel or by the job controlling language, in case of a particular requirement such as inputting a large amount of data registered in the file system or enlarging the font cache memory for printing a large amount of characters, whereby the printing environment can be realized in more flexible manner and can adapt to various user needs.

As explained in the foregoing, the present embodiment is to derive the usable memory size and to determine the default values of the memories to be used according to thus derived memory size.

[Full paint rendering]

Figure 23:
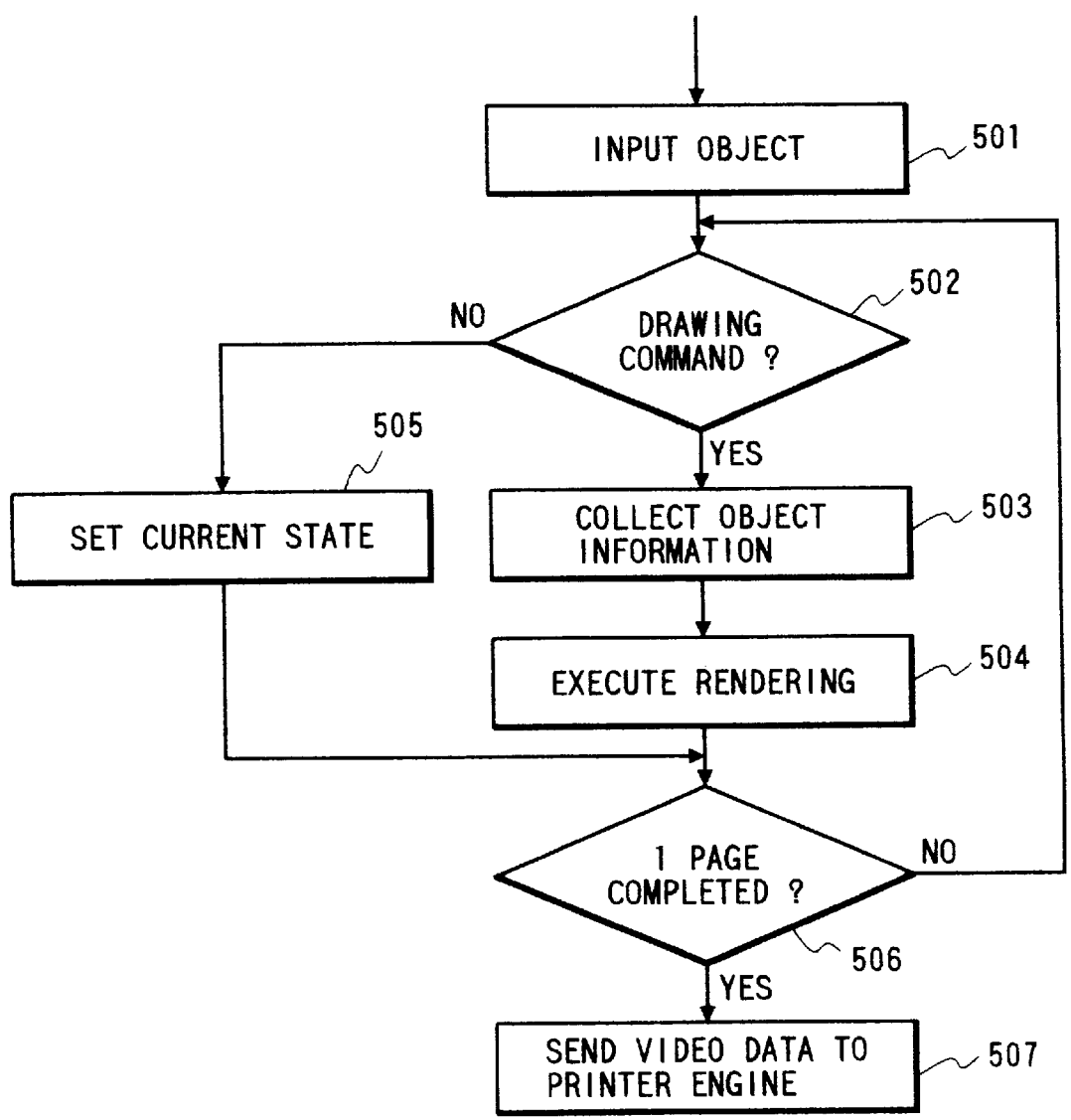
FIG. 23 is a flow chart of a degrading process.

FIG. 23 is a flow chart showing the algorithm on the rendering at the degrading.

A step 501 enters the mask and background information subjected to conversion of resolution by the interpreter rask, and a step 502 discriminates whether the entered object is a drawing command.

If not, a step 505 substitutes the background information and the logic drawing mode into global variables holding the current information.

On the other hand, if the drawing command is identified, a step 503 collects the mask, background and logic drawing information, and a step 504 effects rendering.

When a step 506 identifies that the rendering of the mask data is completed for a page, a step 507 transmits the data to the printer through the engine I/F, in synchronization with the horizontal and vertical synchronization signals.

EMBODIMENT 2

Figure 3:
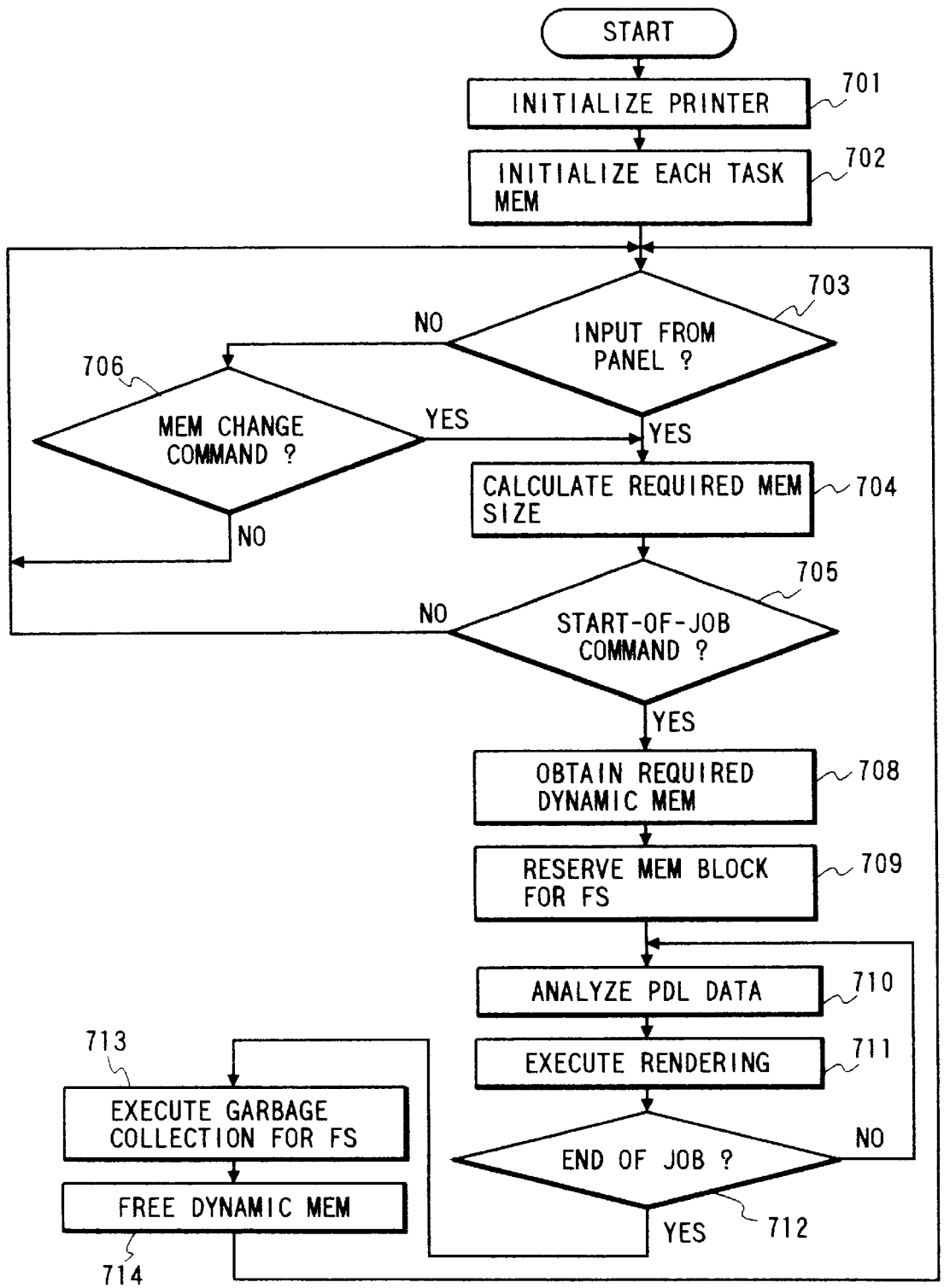
FIG. 3 is a flow chart showing a memory acquiring process in the above-mentioned embodiment.

In this embodiment, the request for a memory change from the operation panel and that by an input command are given in separate paths as shown in FIG. 3, and a later request overrides a preceding one.

Also as a variation, it is also possible to incorporate a command for varying the memory configuration in the job language at the start of a job, to analyze such command at the start of the job (step 906) and to acquire the dynamic memories in as step 908.

Figure 24:
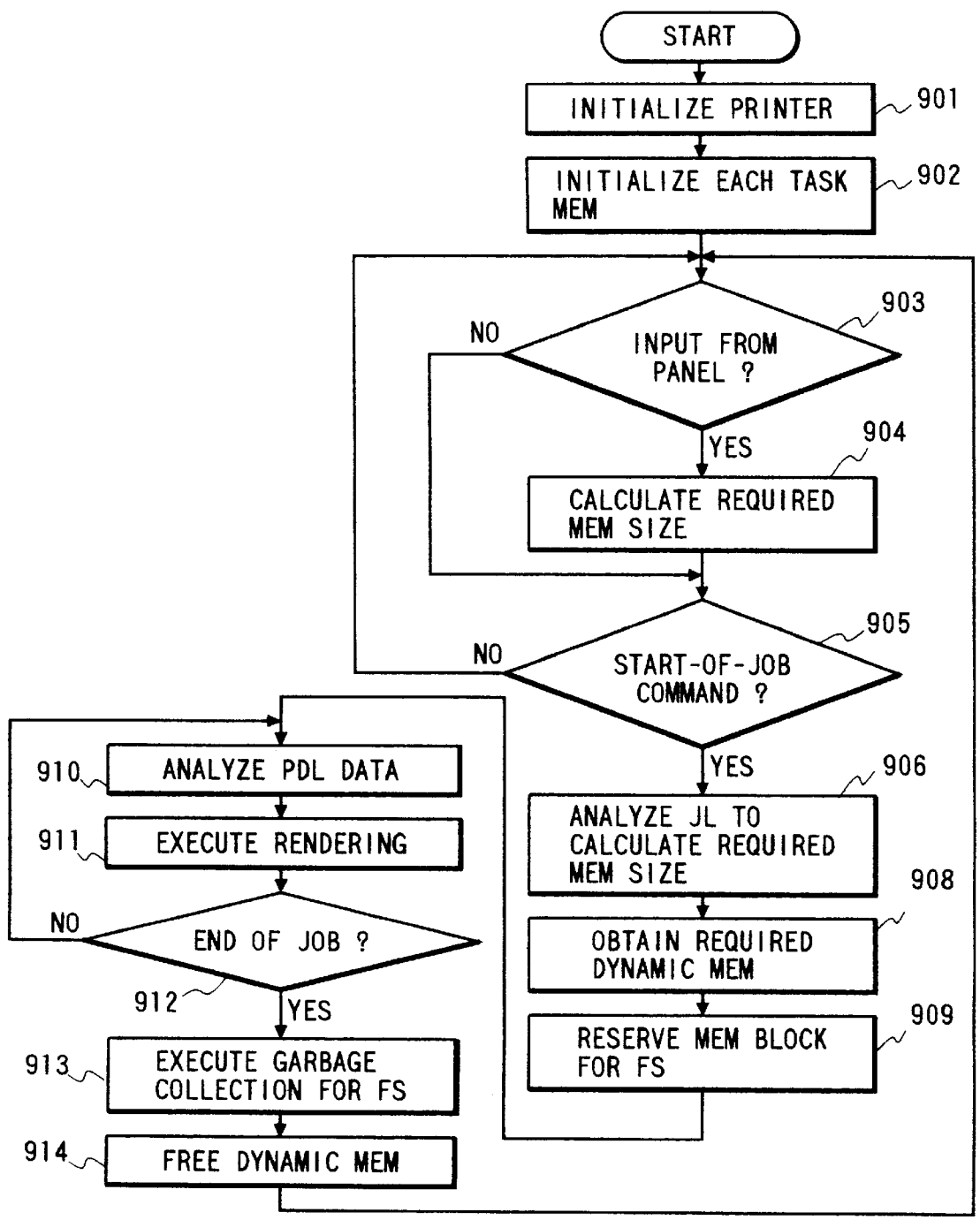
FIG. 24 is a flow chart showing algorithm of another embodiment.
Figure 26:
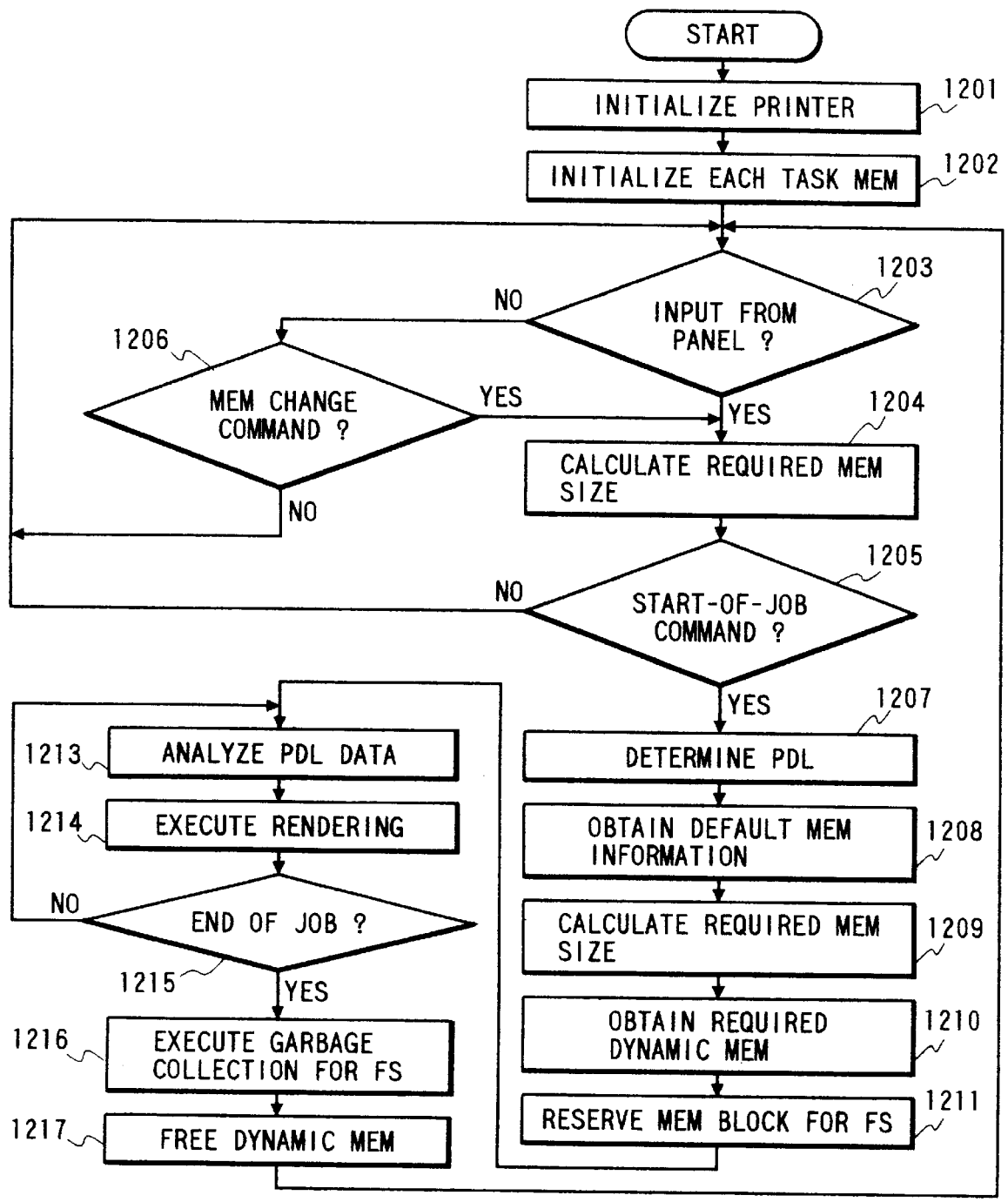
FIG. 26 is a flow chart showing algorithm of another embodiment 2.

An example of such algorithm is shown in FIG. 24, and an example of such job language is shown in FIG. 25. The job language mentioned above includes the PDL and asks the setup of the machine environment and the machine resources for each PDL job, and is useful for commonly using a printer with plural host equipment, for example in a network environment.

Such job language can basically dispense with the conventional printer setting by the operation panel, and there can thus be realized a panelless printer.

EMBODIMENT 3

This embodiment is to optimize the memory configuration for each PDL, since, in a printer emulating plural PDL's, the optimum memory configuration varies depending on the ability of PDL. This will be explained further with reference to FIG. 26.

In this embodiment, the PDL command analyzing unit has a configuration table for the optimum memory configuration as the default for each PDL. Then, at the automatic PDL discrimination (step 1207) based on the data entered from the host equipment, the information on the default memory configuration is acquired from the database or from the program ROM (step 1208) and stored in the memory configuration table 74.

However, such default designation is overwritten (step 1209) by the memory configuration designated from the panel (step 1204) or by the job language or the command (step 1206).

The subsequent process is same as that in the embodiment 2 and will not, therefore, be explained further.

In case of emulating plural PDL's with a single printer, this embodiment allows to vary the state of utilization of the memory for the job of each PDL, whereby the efficiency of utilization of the memory can be improved and the optimum memory configuration can be realized for each PDL.

Also the designation of the memory configuration can be selected according to the environment of utilization by the user, for example from the panel and by the command from the host computer in the above-explained case, or from the host computer in the network environment, or from the operation panel in the conventional terminal printer.

Also in case of an error resulting from the deficiency of the data area in the printer, such error can be avoided by identifying and increasing the deficient data area.

In the following there will be explained, with reference to a memory map shown in FIG. 27, the memory medium such as the program ROM 6, to be employed in the information processing apparatus of the present embodiment.

Figure 27:
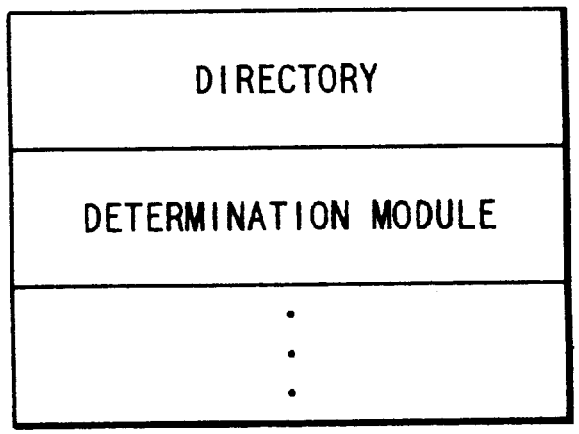
FIGS. 27 to 30 are views showing examples of the memory map of a memory medium storing the control programs.

The recording medium, for storing the control program for deriving the usable memory size and determining the default value of the memory to be used according to thus derived size, is required to at least store the program codes of a "determination module" as shown in FIG. 27.

The "determination module" is a program module for deriving the usable memory size and determining the default value of the memory to be used according to thus derived size.

In addition to the program ROM 104 in the present embodiment, there may also be employed memory media detachable from the color laser beam printer, such as a floppy disk, an optical disk, a magnetooptical disk, a CD-ROM, a CD-R, a magnetic tape or a non-volatile memory card.

In the following there will be explained, with reference to a memory map shown in FIG. 28, the memory medium such as the program ROM 6, to be employed in the output device of the present embodiment.

Figure 28:
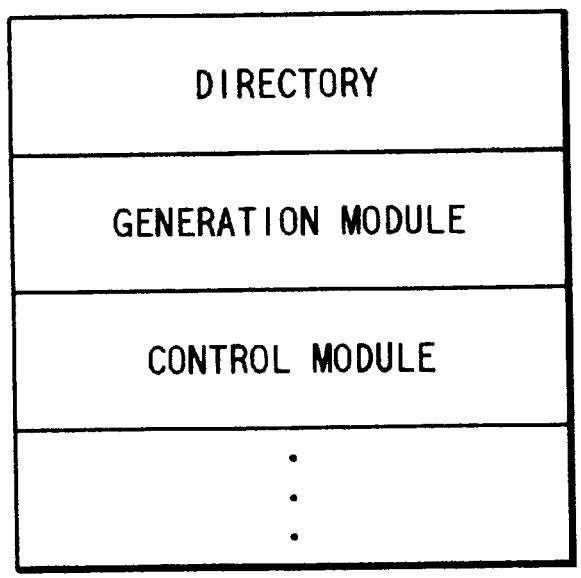

The memory medium, for storing the control program for varying the size of a raster memory for generating and storing output data based on the intermediate data generated for each job unit to be processed according to a memory set value entered from an external equipment or from an operation unit of the output device, is required to at least store the program codes of a "generation module" and a "control module" as shown in FIG. 28.

The "generation module" is a program module for generating the intermediate data based on the input data entered from the external equipment. Also the "control module" is a program module for varying the size of the raster memory for generating and storing the output data, based on the intermediate data generated in the generation module for each job to be processed, according to the memory set value entered from the external equipment or from the operation unit of the output device.

In addition to the program ROM 104 in the present embodiment, there may also be employed memory media detachable from the color laser beam printer, such as a floppy disk, an optical disk, a magnetooptical disk, a CD-ROM, a CD-R, a magnetic tape or a non-volatile memory card.

In the following there will be explained, with reference to a memory map shown in FIG. 29, the memory medium such as the program ROM 6, to be employed in the output device of the present embodiment.

Figure 29:
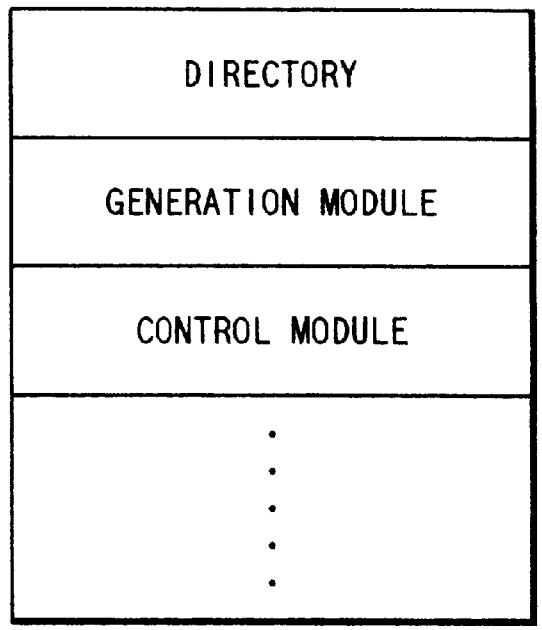

The memory medium, for storing the control program for varying the size of an object memory for storing the intermediate data generated for each job to be processed according to a memory set value entered from an external equipment or from an operation unit of the output device, is required to at least store the program codes of a "generation module" and a "control module" as shown in FIG. 29.

The "generation module" is a program module for generating the intermediate data based on the input data entered from the external equipment. Also the "control module" is a program module for varying the size of the object memory for storing the intermediate data generated by the generation module, for each job to be processed, according to the memory set value entered from the external equipment or from the operation unit of the output device.

In addition to the program ROM 104 in the present embodiment, there may also be employed memory media detachable from the color laser beam printer, such as a floppy disk, an optical disk, a magnetooptical disk, a CD-ROM, a CD-R, a magnetic tape or a non-volatile memory card.

In the following there will be explained, with reference to a memory map shown in FIG. 30, the memory medium such as the program ROM 6, to be employed in the output device of the present embodiment.

Figure 30:
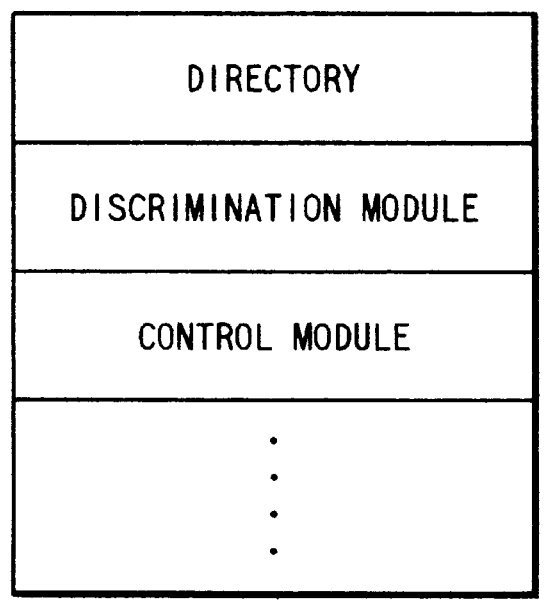

The memory medium, for storing the control program for discriminating a set value based on memory control information entered from an external equipment or from an operation unit of the output device and varying the total size of a predetermined memory to be used in the output device to a designated set value, for each job to be processed according to the result of discrimination, is required to at least store a "discrimination module" and a "control module" as shown in FIG. 30.

The "discrimination module" is a program module for discriminating the set value based on the memory control information entered from the external equipment or from the operation unit of the output device. The "control module" is a program module for varying the total size of the predetermined memory to be used in the output device to the designated set value, for each job to be processed, according to the result of discrimination by the "discrimination module".

In addition to the program ROM 104 in the present embodiment, there may also be employed memory media detachable from the color laser beam printer, such as a floppy disk, an optical disk, a magnetooptical disk, a CD-ROM, a CD-R, a magnetic tape or a non-volatile memory card.

What is claimed is:

1. An information processing apparatus, comprising:
   discrimination means for discriminating a total size of a plurality of memory areas to be set based on information entered from an external piece of equipment or an operation unit; and
   control means for variably setting the total size of the plurality of memory areas to be used in said apparatus, based on the result of discrimination by said discrimination means, and for determining a size of each of the plurality of memory areas.

2. An apparatus according to claim 1, further comprising input means for inputting data described in a printer language.

3. An apparatus according to claim 2, further comprising means for generating intermediate data from the input data and means for generating output data from the intermediate data.

4. An apparatus according to claim 3, wherein the output data are bit map image data.

5. An apparatus according to claim 3, wherein the plurality of memory areas comprise an object memory area for storing the intermediate data and a raster memory area for storing the output data.

6. An apparatus according to claim 3, wherein the information is adapted to designate a memory amount value of the total size.

7. An apparatus according to claim 1, wherein said apparatus is adapted to detachably connect to an external memory means.

8. A memory control method for an information processing apparatus, comprising:
   a discrimination step of discriminating a total size of a plurality of memory areas to be set based on information entered from an external piece of equipment or an operation unit; and
   a control step of variably setting the total size of the plurality of memory areas to be used in the apparatus, based on the result of discrimination in said discrimination step, and for determining a size of each of the plurality of memory areas.

9. A memory control method according to claim 8, further comprising the step of inputting data described in a printer language.

10. A memory control method according to claim 9, further comprising the steps of generating intermediate data from the input data and of generating output data from the intermediate data.

11. A memory control method according to claim 10, wherein the output data are bit map image data.

12. A memory control method according to claim 10, wherein the plurality of memory areas comprise an object memory area for storing the intermediate data and a raster memory area for storing the output data.

13. A memory control method according to claim 11, wherein the information is adapted to designate a memory amount value of the total size.

14. A memory control method according to claim 8, wherein the apparatus is adapted to detachably connect to an external memory means.

15. A memory medium for storing a control program executed in an information processing apparatus, with the program comprising modules for:
   discriminating a total size of a plurality of memory areas to be set based on information entered from an external piece of equipment or an operation unit; and
   variably setting the total size of the plurality of memory areas to be used in the apparatus for each job to be processed, based on the result of discrimination by said discrimination module.

16. An apparatus according to claim 3, wherein said plurality of memory areas comprise at least two areas selected from a data input buffer area, a cache table area, a polypen table area, a clip object table area, an intermediate buffer area, a band raster memory area and a dither pattern area.

17. An apparatus according to claim 3, further comprising means for forming an image on a sheet based on the output data.

18. An apparatus according to claim 17, wherein said information is adapted to designate a sheet size to be used in said apparatus.

19. A memory control method according to claim 10, wherein the plurality of memory areas comprise at least two areas selected from a data input buffer area, a cache table area, a polypen table area, a clip object table area, an intermediate buffer area, a band raster memory area and a dither pattern area.

20. A memory control method according to claim 10, further comprising the step of forming an image on a sheet based on the output data.

21. A memory control method according to claim 20, wherein the information is adapted to designate a sheet size to be used in the apparatus.

22. A memory medium according to claim 15, further comprising a module for performing the step of inputting data described in a printer language.

23. A memory medium according to claim 16, further comprising modules for performing the steps of generating intermediate data from the input data and of generating output data from the intermediate data.

24. A memory medium according to claim 17, wherein the output data are bit map image data.

25. A memory medium according to claim 17, wherein the plurality of memory areas comprise an object memory area for storing the intermediate data and a raster memory area for storing the output data.

26. A memory medium according to claim 18, wherein the information is adapted to designate a memory amount value of the total size.

27. A memory medium according to claim 15, wherein the apparatus is adapted to detachably connect to an external memory means.

28. A memory medium according to claim 17, wherein the plurality of memory areas comprise at least two areas selected from a data input buffer area, a cache table area, a polypen table area, a clip object table area, an intermediate buffer area, a band raster memory area and a dither pattern area.

29. A memory medium according to claim 17, further comprising a module for performing the step of forming an image on a sheet based on the output data.

30. A memory medium according to claim 29, wherein the information is adapted to designate a sheet size to be used in the apparatus.

\* \* \* \* \*